(12) United States Patent
Hwang et al.

(10) Patent No.: US 12,135,590 B2
(45) Date of Patent: Nov. 5, 2024

(54) ELECTRONIC DEVICE COMPRISING SENSOR MODULE

(71) Applicant: Samsung Electronics Co., Ltd., Suwon-si (KR)

(72) Inventors: Byungseon Hwang, Suwon-si (KR); Deokhee Lee, Suwon-si (KR); Sunggyu Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 17/521,186

(22) Filed: Nov. 8, 2021

(65) Prior Publication Data

US 2022/0057846 A1    Feb. 24, 2022

Related U.S. Application Data

(63) Continuation of application No. PCT/KR2020/005784, filed on Apr. 29, 2020.

(30) Foreign Application Priority Data

May 13, 2019  (KR) ........................ 10-2019-0055914

(51) Int. Cl.
*G06F 1/16* (2006.01)
*G06V 40/13* (2022.01)

(52) U.S. Cl.
CPC .......... *G06F 1/1684* (2013.01); *G06F 1/1616* (2013.01); *G06F 1/1652* (2013.01);
(Continued)

(58) Field of Classification Search
CPC ....... G06F 1/16–1698; G06F 3/02–027; G06F 1/18–189; G06F 21/30–36;
(Continued)

(56) References Cited

U.S. PATENT DOCUMENTS 10,678,428 B2    6/2020  Kim et al.
2010/0176476 A1*  7/2010  Takayama ......... H01L 27/14683
                                                                83/13
(Continued)

FOREIGN PATENT DOCUMENTS

CN      101188202 A    5/2008
CN      106625034 B    8/2018
(Continued)

OTHER PUBLICATIONS

International Search Report dated Apr. 29, 2020, issued in International Patent Application No. PCT /KR2020/005784.
(Continued)

*Primary Examiner* — Amr A Awad
*Assistant Examiner* — Aaron Midkiff
(74) *Attorney, Agent, or Firm* — Jefferson IP Law, LLP

(57) ABSTRACT

An electronic device is provided. The electronic device includes a housing and a sensor module disposed in at least a portion of the housing. The sensor module includes a fingerprint recognition sensor, a protective layer covering the fingerprint recognition sensor, an adhesive member placed on the protective layer, and a ceramic layer placed on the adhesive member, wherein the edge of the ceramic layer, the edge of the adhesive member, and the edge of a part of the protective layer include machined surfaces. Other embodiments are also possible.

16 Claims, 23 Drawing Sheets

(52) U.S. Cl.
CPC .......... *G06F 1/1656* (2013.01); *G06F 1/1681* (2013.01); *G06V 40/13* (2022.01)

(58) Field of Classification Search
CPC .. H04M 1/0216; H04M 1/0266; H04M 1/026; G06V 40/12–1394; C09J 7/20; C09J 2203/326; C09J 2400/126; C09J 7/00; C08J 5/12; A61B 5/1172; H01L 21/56; H01L 27/146–14698; B26D 1/00–626; B26D 3/00–30; B26D 2001/0013–0093; H01H 1/06–065; H01H 9/04–047; H01H 11/06; H01H 13/06; H01H 13/063; H01H 13/503; H01H 15/06; H01H 17/06; H01H 19/06; H01H 19/065; H01H 19/64; H01H 2011/062–067; H01H 2013/066; H01H 2223/036; H01H 13/00–88; H01H 2215/00–054; H01H 2221/00–09; H05K 7/14
USPC ........................................................ 200/307
See application file for complete search history.

(56) References Cited

U.S. PATENT DOCUMENTS

| | | | |
|---|---|---|---|
| 2011/0255259 | A1 | 10/2011 | Weber et al. |
| 2013/0318766 | A1 | 12/2013 | Kiple et al. |
| 2013/0319755 | A1 | 12/2013 | Kiple et al. |
| 2014/0139422 | A1 | 5/2014 | Mistry et al. |
| 2014/0332358 | A1* | 11/2014 | Shinohara ............. H01H 13/14 200/314 |
| 2015/0011038 | A1 | 1/2015 | Huang et al. |
| 2015/0071509 | A1 | 3/2015 | Myers |
| 2015/0243711 | A1* | 8/2015 | Hong ................. H10K 50/8426 257/40 |
| 2016/0026381 | A1 | 1/2016 | Kim et al. |
| 2017/0090593 | A1 | 3/2017 | Cao et al. |
| 2017/0124370 | A1 | 5/2017 | He et al. |
| 2017/0372123 | A1* | 12/2017 | Kim ...................... G06F 3/0412 |
| 2018/0293420 | A1 | 10/2018 | Kim et al. |
| 2019/0028579 | A1* | 1/2019 | Cho .................... G06F 3/04886 |
| 2019/0347389 | A1* | 11/2019 | Kawakita ................ G06F 21/32 |
| 2020/0249820 | A1 | 8/2020 | Choi et al. |

FOREIGN PATENT DOCUMENTS

| | | |
|---|---|---|
| EP | 2 977 850 A1 | 1/2016 |
| JP | 10247432 A | 9/1988 |
| JP | 2011-54925 A | 3/2011 |
| JP | 2015-19031 A | 1/2015 |
| JP | 2018-530061 A | 10/2018 |
| KR | 10-2014-0064688 A | 5/2014 |
| KR | 10-2016-0012779 A | 2/2016 |
| KR | 10-2016-0071352 A | 6/2016 |
| KR | 10-2017-0085248 A | 7/2017 |
| KR | 10-1924916 B1 | 9/2017 |
| KR | 10-2018-0032866 A | 4/2018 |
| KR | 10-1898571 B1 | 9/2018 |
| KR | 10-1910518 B1 | 10/2018 |
| KR | 10-2019-0004122 A | 1/2019 |
| WO | 2017-082589 A1 | 5/2017 |

OTHER PUBLICATIONS

European Search Report dated May 13, 2022, issued in European Application No. 20806510.2.
Chinese Office Action dated Nov. 3, 2023, issued in Chinese Patent Application No. 202080035542.6.
European Office Action dated Jan. 3, 2024, issued in European Patent Application No. 20806510.2.
Chinese Office Action dated Apr. 19, 2024, issued in Chinese Application No. 202080035542.6.
Korean Office Action dated Apr. 15, 2024, issued in Korean Application No. 10-2019-0055914.
Decision of Rejection dated Jul. 23, 2024, issued in Chinese Application No. 202080035542.6.

* cited by examiner

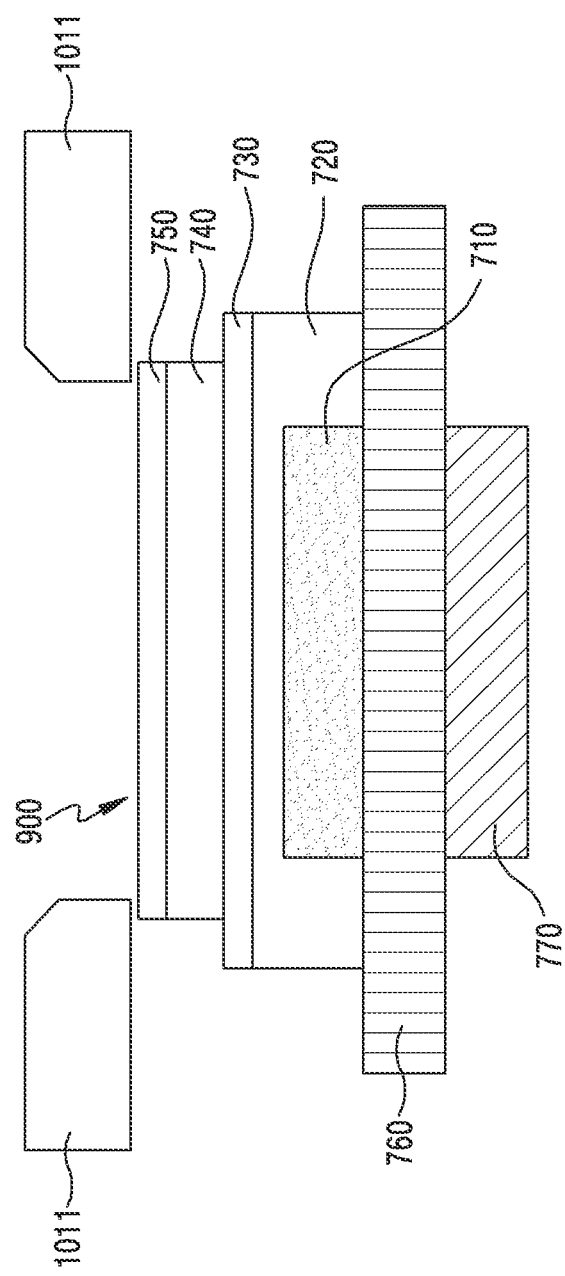

ELECTRONIC DEVICE COMPRISING SENSOR MODULE

CROSS-REFERENCE TO RELATED APPLICATION(S)

This application is a U.S. National Stage application under 35 U.S.C. § 371 of an International application number PCT/KR2020/005784, filed on Apr. 29, 2020, which is based on and claimed priority of a Korean patent application number 10-2019-0055914, filed on May 13, 2019, in the Korean Intellectual Property Office, the disclosure of which is incorporated by reference herein in its entirety.

BACKGROUND

1. Field

The disclosure relates to an electronic device including a sensor module. More particularly, the disclosure relates to an electronic device which provides a sensor module including a processed ceramic layer.

2. Description of Related Art

A multi-purpose electronic device may be provided with an authentication function which uses biometric information, such as user's fingerprint or iris as a means for personal authentication. A fingerprint recognition sensor may be usually disposed on an area or a button exposed to the outside of an electronic device, and may contact user's finger to detect a fingerprint. The fingerprint recognition sensor may be manufactured through a surface treatment process, such as painting, film transfer, and ceramic attachment, to protect the fingerprint recognition sensor and to provide a good sense of manipulation to a user. From among the surface treatment methods of the fingerprint recognition sensor, the ceramic attachment method may seat a ceramic sheet on the fingerprint recognition sensor by using a thermosetting adhesive, and then may perform a thermal curing process.

The above information is presented as background information only to assist with an understanding of the disclosure. No determination has been made, and no assertion is made, as to whether any of the above might be applicable as prior art with regard to the disclosure.

SUMMARY

To attach a ceramic layer to a fingerprint recognition sensor by using a thermosetting adhesive member, a thermal curing adhesion process should be performed typically at 200° C. for two hours. If the fingerprint recognition sensor is exposed to high temperature for a long time during the thermal curing adhesion process, a die mark phenomenon in which an exterior surface of the fingerprint recognition sensor is deformed may occur.

A sharp edge of the ceramic layer included in the fingerprint recognition sensor module may be vulnerable to an impact and may inflict an injury on a user when the user uses it. Accordingly, the fingerprint recognition sensor module may include a means for protecting the sharp edge of the ceramic layer in order to dispose the fingerprint recognition sensor having the ceramic layer attached thereto in a housing or on a button of an electronic device. The fingerprint recognition sensor disposed on a front surface or a rear surface of the electronic device may be disposed not to expose the edge to the outside through a structure of the housing. However, if the fingerprint recognition sensor is mounted on a side surface of the electronic device, the sharp edge of the ceramic layer may be exposed to the outside due to space constraint.

Aspects of the disclosure are to address at least the above-mentioned problems and/or disadvantages and to provide at least the advantages described below. Accordingly, an aspect of the disclosure is to provide an electronic device which provides a sensor module including a processed ceramic layer.

Additional aspects will be set forth in part in the description which follows and, in part, will be apparent from the description, or may be learned by practice of the presented embodiments.

In accordance with an aspect of the disclosure, an electronic device is provided. The electronic device includes a housing, and a sensor module disposed in at least a portion of the housing, wherein the sensor module includes a fingerprint recognition sensor, a protection layer to enclose the fingerprint recognition sensor, an adhesive member disposed on the protection layer, and a ceramic layer disposed on the adhesive member, wherein a periphery of the ceramic layer, a periphery of the adhesive member, and a periphery of one portion of the protection layer includes a processed surface.

In accordance with another aspect of the disclosure, a sensor module is provided. The sensor module includes a fingerprint recognition sensor, a protection layer enclosing the fingerprint recognition sensor, a ultraviolet (UV) curing adhesive member disposed on the protection layer, a ceramic layer disposed on the adhesive member and allowing UV rays to pass therethrough, and a coating layer disposed on the ceramic layer and forming one surface of the sensor module, wherein the one surface is substantially parallel to the fingerprint recognition sensor, and the coating layer, the ceramic layer, the UV curing adhesive member, and one portion of the protection layer include a processed surface.

The electronic device according to various embodiments can omit a thermal curing process of high temperature by using the UV curing adhesive member. Due to the characteristic of the UV curing adhesive member instantaneously curing in reaction to UV rays, surface deformation caused during a thermal curing process can be prevented and the electronic device can implement surface flatness of the sensor module.

The electronic device according to various embodiments can remove a sharp edge of the ceramic layer by processing one surface of the sensor module. The sensor module from which the sharp edge of the ceramic layer is removed can reduce the risk of injuring a user, and can have durability even when being exposed to the outside.

The sensor module according to various embodiments may be disposed on a front surface, a rear surface, or a side surface of the electronic device when there is no means for protecting a side surface of the sensor module.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 11C is a cross-sectional view of an electronic device including a sensor module according to an embodiment of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
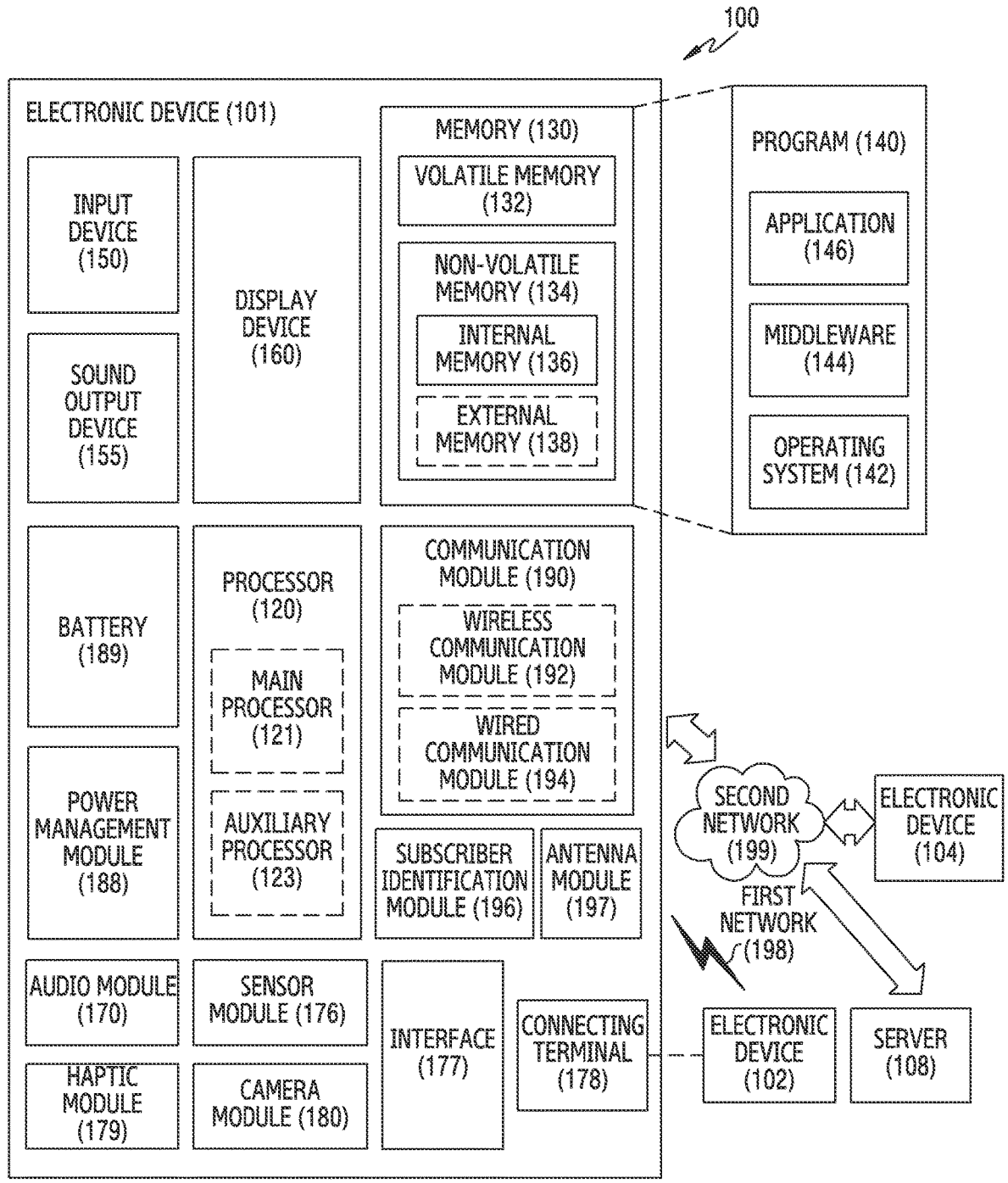
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., PCB). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
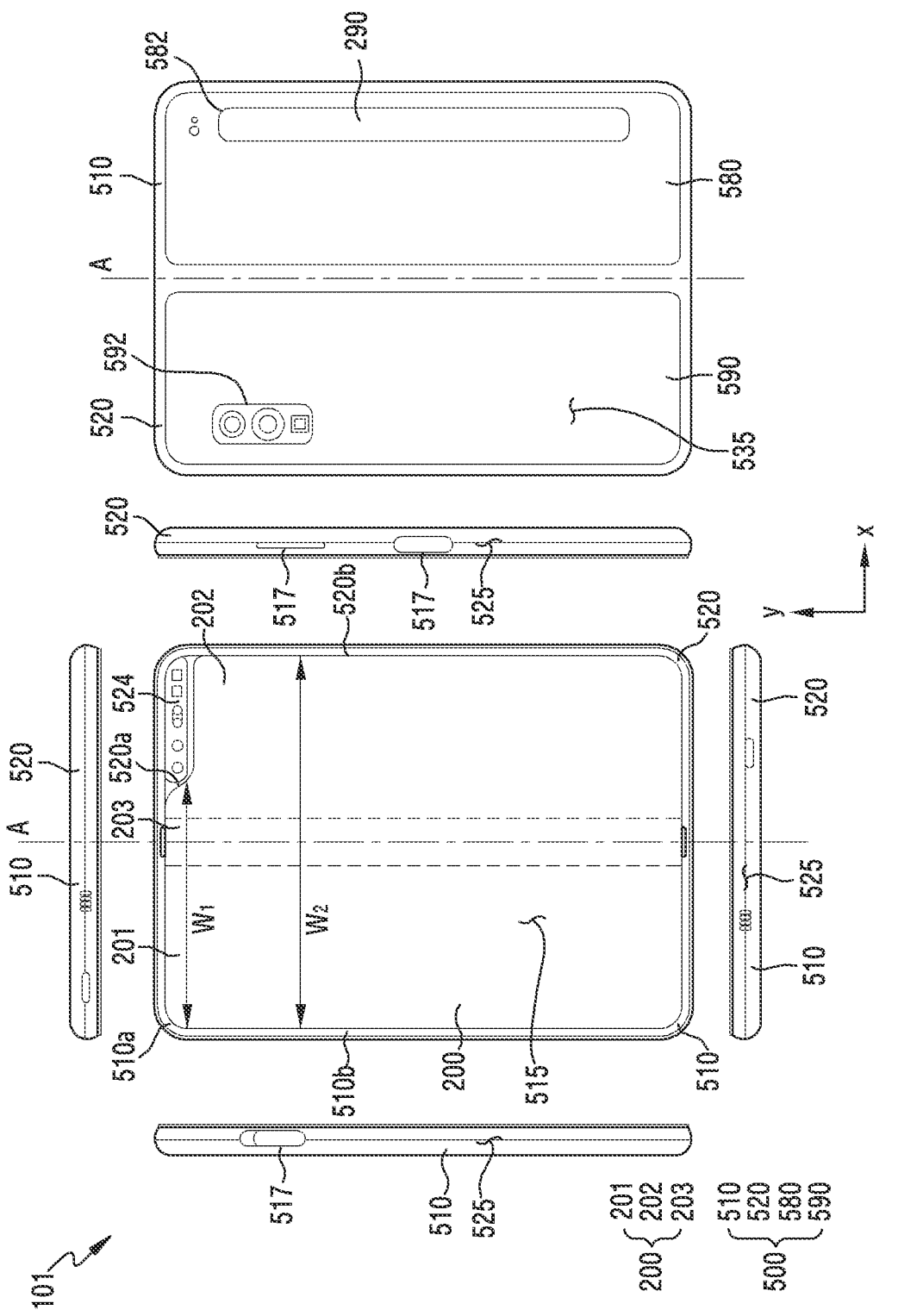
FIG. 2 is a view illustrating a flat state of an electronic device according to an embodiment of the disclosure.
Figure 3:
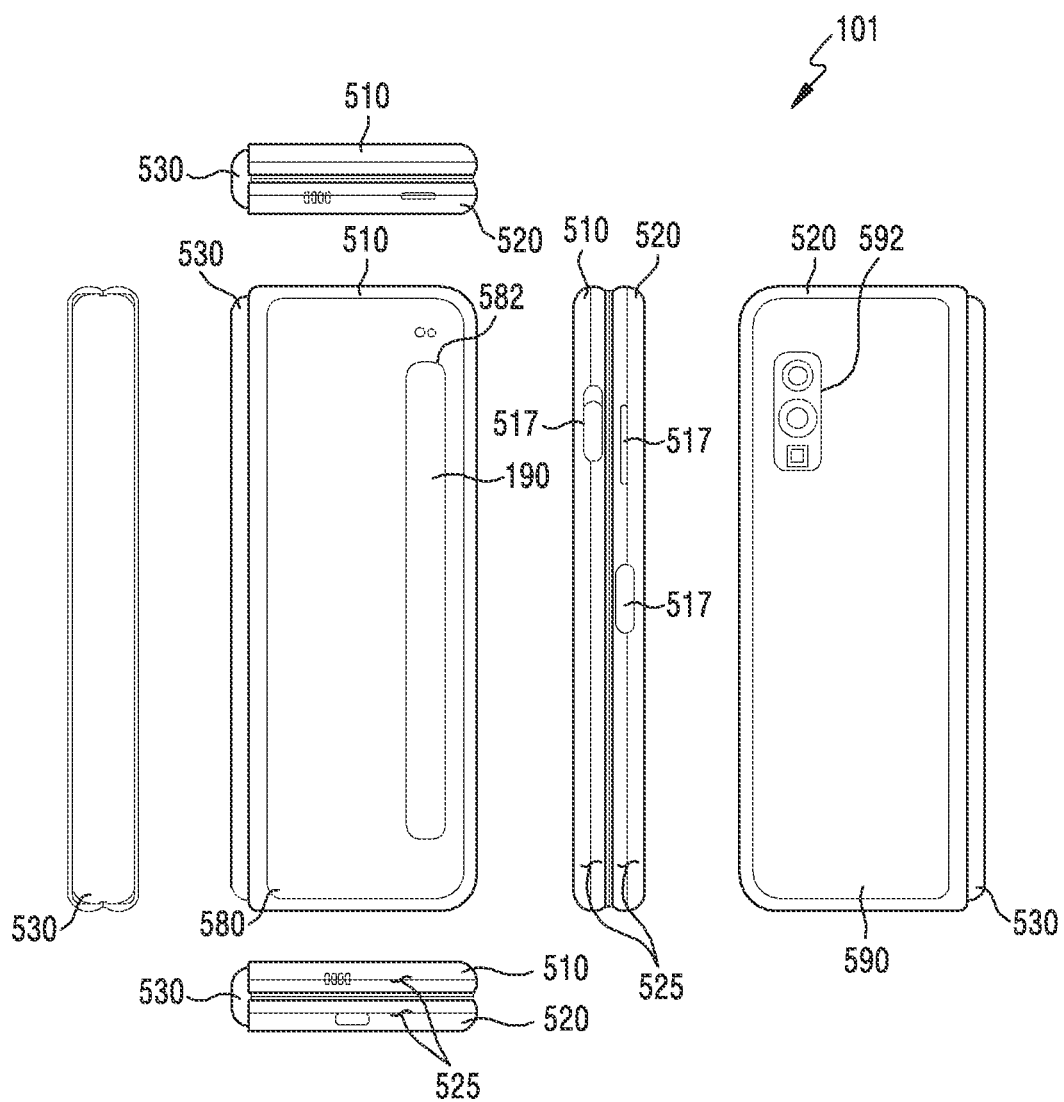
FIG. 3 is a view illustrating a folded state of an electronic device according to an embodiment of the disclosure.

FIG. 2 is a view illustrating a flat state of an electronic device according to an embodiment of the disclosure. FIG. 3 is a view illustrating a folded state of an electronic device according to an embodiment of the disclosure.

Referring to FIGS. 2 and 3, in an embodiment of the disclosure, the electronic device 101 may include a foldable housing 500, a hinge cover 530 to cover a foldable portion of the foldable housing, and a flexible or foldable display 200 (hereinafter, referred to as a "display" 200) disposed in a space formed by the foldable housing 500. The electronic device 101 may include a front surface 515 on which the display 200 is disposed, a rear surface 535 which is the opposite surface of the front surface 515, and a side surface 525 which encloses a space between the front surface 515 and the rear surface 535.

In an embodiment of the disclosure, the foldable housing 500 may include a first housing structure 510, a second housing structure 520 including a sensor area 524, a first rear surface cover 580, and a second rear surface cover 590. The foldable housing 500 of the electronic device 101 is not limited to a shape and coupling shown in FIGS. 2 and 3, and may be implemented by other shapes or a combination and/or coupling of components. For example, in another embodiment of the disclosure, the first housing structure 510 and the first rear surface cover 580 may be integrally formed with each other, and the second housing structure 520 and the second rear surface cover 590 may be integrally formed with each other.

In the illustrated embodiment of the disclosure, the first housing structure 510 and the second housing structure 520 may be disposed on both sides with reference to a folding axis (A axis), and may have a substantially symmetrical shape with respect to the folding axis A. As will be described below, the first housing structure 510 and the second housing structure 520 may have an angle or a distance therebetween changed according to whether the electronic device 101 is in a flat state, a folded state, or an intermediate state. In the illustrated embodiment of the disclosure, the second housing structure 520 additionally includes the sensor area 324 where various sensors are disposed, differently from the first housing structure 510, but may have a symmetrical shape on the other area.

In an embodiment of the disclosure, the first housing structure 510 and the second housing structure 520 may form a recess to accommodate the display 200 all together as shown in FIG. 2. In the illustrated embodiment of the disclosure, the recess may have two or more different widths in a direction perpendicular to the folding axis A due to the sensor area 524.

For example, the recess may have (1) a first width w1 between a first portion 510a of the first housing structure 510 that is parallel to the folding axis A, and a first portion 520a of the second housing structure 520 that is formed on an edge of the sensor area 524, and (2) a second width w2 formed by a second portion 510b of the first housing structure 510 and a second portion 520b of the second housing structure 520 that does not correspond to the sensor area 524 and is parallel to the folding axis A. In this case, the second width w2 may be longer than the first width w1. In other words, the first portion 510a of the first housing structure 510 and the first portion 520a of the second housing structure 520, which have an asymmetrical shape, may form the first width w1 of the recess, and the second portion 510b of the first housing structure 510 and the second portion 520b of the second housing structure 520, which have a symmetrical shape, may form the second width w2 of the recess. In an embodiment of the disclosure, the first portion 520a and the second portion 520b of the second housing structure 520 may have different distances from the folding axis A. The width of the recess is not limited to the illustrated example. In an embodiment of the disclosure, the recess may have a plurality of widths according to a shape of the sensor area 524 or portions of the first housing structure 510 and the second housing structure 520 that have an asymmetrical shape.

In an embodiment of the disclosure, at least a portion of the first housing structure 510 and the second housing structure 520 may be formed with a metallic material or a nonmetallic material having stiffness of a size selected to support the display 200.

In an embodiment of the disclosure, the sensor area 524 may be formed to have a predetermined area adjacent to one corner of the second housing structure 520. However, the disposal, shape, and size of the sensor area 524 are not limited to the illustrated example. For example, in another embodiment of the disclosure, the sensor area 524 may be provided on another corner of the second housing structure 520 or a certain area between an upper end corner and a lower end corner. In an embodiment of the disclosure, components which are embedded in the electronic device 101 to perform various functions may be exposed to the front surface 515 of the electronic device 101 through the sensor area 524 or one or more openings provided on the sensor area 524. In an embodiment of the disclosure, the components may include various types of sensors. The sensors may include, for example, at least one of a front-facing camera, a receiver, or a proximity sensor.

The first rear surface cover 580 may be disposed on one side of the folding axis on the rear surface 535 of the electronic device 101, and for example, may have a substantially rectangular periphery and may have the periphery surrounded by the first housing structure 510 Similarly, the second rear surface cover 590 may be disposed on the other side of the folding axis on the rear surface 535 of the electronic device 101, and may have its periphery surrounded by the second housing structure 520.

In the illustrated embodiment of the disclosure, the first rear surface cover 580 and the second rear surface cover 590 may have a substantially symmetrical shape with reference to the folding axis (A axis). However, the first rear surface cover 580 and the second rear surface cover 590 may not necessarily have the symmetrical shape, and in another embodiment of the disclosure, the electronic device 101 may include the first rear surface cover 580 and the second rear surface cover 590 of various shapes. In still another embodiment of the disclosure, the first rear surface cover 580 may be integrally formed with the first housing structure 510, and the second rear surface cover 590 may be integrally formed with the second housing structure 520.

In an embodiment of the disclosure, the first rear surface cover 580, the second rear surface cover 590, the first housing structure 510, and the second housing structure 520 may form a space to have various components (for example, a printed circuit board or a battery) of the electronic device 101 disposed therein. In an embodiment of the disclosure, one or more components may be disposed on the rear surface 535 of the electronic device 101 or may be visually exposed. For example, at least a portion of a sub display 290 may be visually exposed through a first rear surface area 582 of the first rear surface cover 580. In another embodiment of the disclosure, one or more components or a sensor may be visually exposed through a second rear surface area 592 of the second rear surface cover 590. In an embodiment of the disclosure, the sensor may include a proximity sensor and/or a rear-facing camera.

In an embodiment of the disclosure, the electronic device 101 may include a key input device 517. The key input device 517 may include a function button, such as a volume control button or a power button. According to an embodiment of the disclosure, the key input device 517 may be disposed on the side surface 525 of the electronic device 101. In another embodiment of the disclosure, the electronic device 101 may not include a portion of the above-mentioned key input device 517 and the key input device that is not included may be implemented on the display 200 in other forms, such as a soft key, or the like. According to an embodiment of the disclosure, the key input device 517 may include various types of sensor modules (for example, the sensor module 176 of FIG. 1). For example, the key input device 517 may include a fingerprint recognition sensor module. The fingerprint recognition sensor module may be mounted in the key input device 517, such that the key input device 517 can be used doubly as a fingerprint sensor button.

Referring to FIG. 3, the hinge cover 530 may be disposed between the first housing structure 510 and the second housing structure 520, and may be configured to hide inner components (for example, a hinge structure 540). In an embodiment of the disclosure, the hinge cover 530 may be hidden by a portion of the first housing structure 510 and the second housing structure 520, or may be exposed to the outside, according to a state (a flat state or a folded state) of the electronic device 101.

For example, when the electronic device 101 is in the flat state as shown in FIG. 2, the hinge cover 530 may be hidden by the first housing structure 510 and the second housing structure 520 and may not be exposed. For example, when the electronic device 101 is in the folded state (for example, a fully folded state) as shown in FIG. 3, the hinge cover 530 may be exposed to the outside between the first housing structure 510 and the second housing structure 520. For example, in an intermediate state in which the first housing structure 510 and the second housing structure 520 are folded with a certain angle, the hinge cover 530 may be exposed to the outside in part between the first housing structure 510 and the second housing structure 520. However, in this case, the exposed area may be smaller than in the fully folded state. In an embodiment of the disclosure, the hinge cover 530 may include a curved surface.

The display 200 may be disposed in the space formed by the foldable housing 500. For example, the display 200 may be seated on the recess formed by the foldable housing 500, and may form most of the front surface 515 of the electronic device 101.

Accordingly, the front surface 515 of the electronic device 101 may include the display 200, and some areas of the first housing structure 510 adjacent to the display 200 and some areas of the second housing structure 520. In addition, the rear surface 535 of the electronic device 101 may include the first rear surface cover 580, some areas of the first housing structure 510 that are adjacent to the first rear surface cover 580, the second rear surface cover 590, and some areas of the second housing structure 520 that are adjacent to the second rear surface cover 590.

The display 200 may refer to a display that has at least some areas deformed to a flat surface or a curved surface. In an embodiment of the disclosure, the display 200 may include a folding area 203, a first area 201 disposed on one side (the left of the folding area 203 show in FIG. 2) with reference to the folding area 203, and a second area 202 disposed on the other side (the right of the folding area 203 shown in FIG. 2).

The divided areas of the display 200 shown in FIG. 2 are examples and the display 200 may be divided into a plurality of areas (for example, four or more areas or two areas) according to a structure or a function of the display 200. For example, in the embodiment illustrated in FIG. 1, the display 200 may be divided into areas by the folding area 203 extended in parallel with the y-axis or the folding axis (A axis). In another embodiment of the disclosure, the display 200 may be divided into areas with reference to another folding area (for example, a folding area parallel to the x-axis) or another folding axis (for example, a folding axis parallel to the x-axis).

The first area 201 and the second area 202 may have a substantially symmetrical shape with reference to the folding area 203. However, the second area 202 may include a notch that is cut according to the presence of the sensor area 524, differently from the first area 201, but may have a symmetrical shape with the first area 201 on the other area. In other words, the first area 201 and the second area 202 may include portions that have a symmetrical shape and portions that have an asymmetrical shape.

Hereinafter, operations of the first housing structure 510 and the second housing structure 520 and respective areas of the display 200 according to a state (for example, a flat state or a folded state) of the electronic device 101 will be described.

In an embodiment of the disclosure, when the electronic device 101 is in the flat state (for example, FIG. 2), the first housing structure 510 and the second housing structure 520 may form the angle of 180° and may be disposed to face in the same direction. A surface of the first area 201 of the display 200 and a surface of the second area 202 may form the angle of 180° with each other, and may face in the same direction (for example, the front surface 515 direction of the electronic device 101). The folding area 203 may form the same plane as the first area 201 and the second area 202.

In an embodiment of the disclosure, when the electronic device 101 is in the folded state (for example, FIG. 2), the first housing structure 510 and the second housing structure 520 may be disposed to face each other. The surface of the first area 201 of the display 200 and the surface of the second area 202 may form a small angle (for example, between 0° and 10°) with each other, and may face each other. At least a portion of the folding area 203 may have a curved surface having a predetermined curvature.

In an embodiment of the disclosure, when the electronic device 101 is in the intermediate state (folded state), the first housing structure 510 and the second housing structure 520 may be disposed with a certain angle. The surface of the first area 201 of the display 200 and the surface of the second area 202 may form an angle that is larger than in the folded state and is smaller than in the flat state. At least a portion of the folding area 203 may have a curved surface having a predetermined curvature, and the curvature in this state may be smaller than in the folded state.

Figure 4:
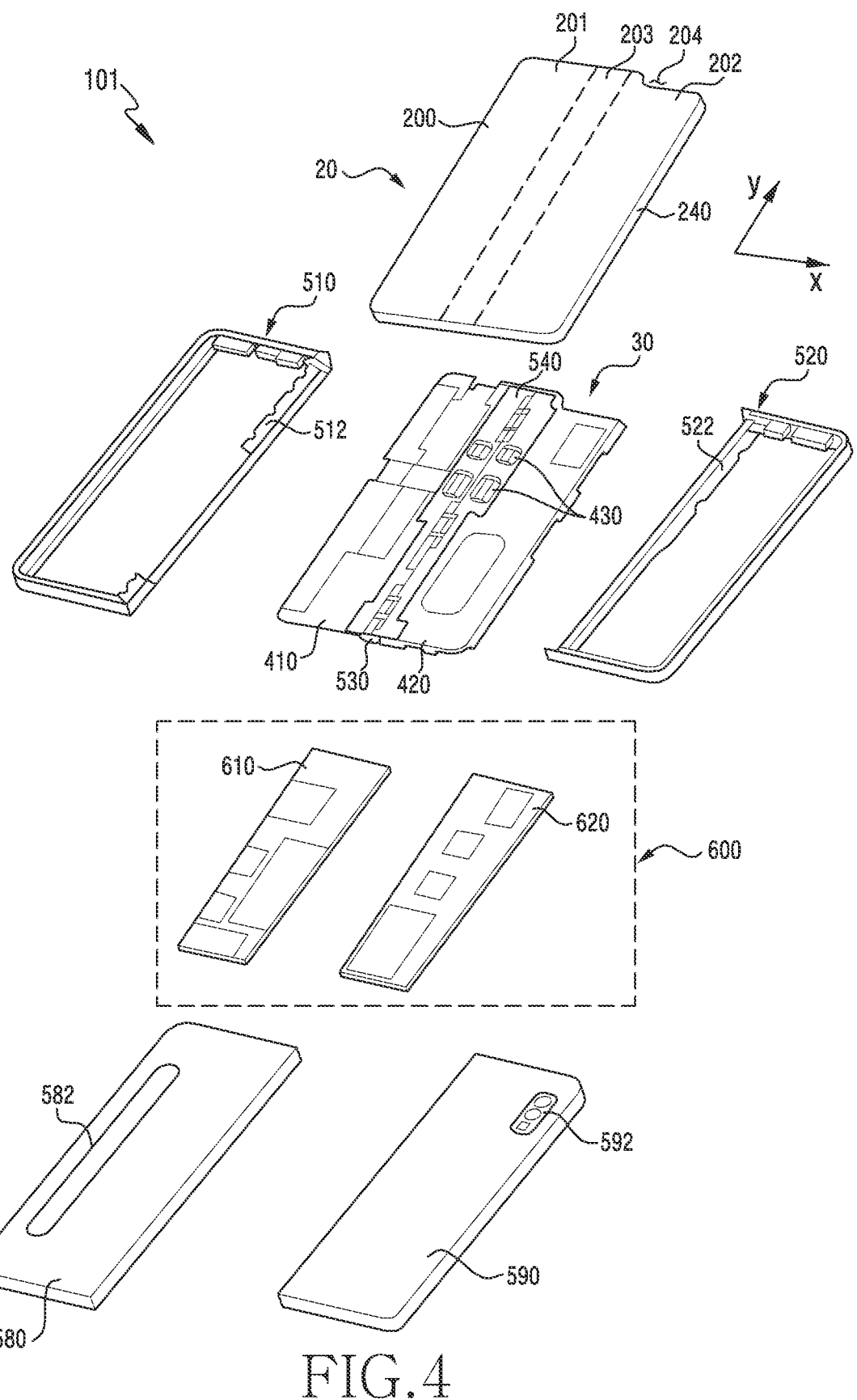
FIG. 4 is an exploded perspective view of an electronic device according to an embodiment of the disclosure.

FIG. 4 is an exploded perspective view of an electronic device according to an embodiment of the disclosure.

Referring to FIG. 4, in an embodiment of the disclosure, the electronic device 101 may include a display unit 20, a bracket assembly 30, a board unit 600, a first housing structure 510, a second housing structure 520, a first rear surface cover 580, and a second rear surface cover 590. In the disclosure, the display unit 20 may be referred to as a display module or a display assembly.

The display unit 20 may include a display 200 and one or more plates or layers on which the display 200 is seated. In an embodiment of the disclosure, the plate 240 may be disposed between the display 200 and the bracket assembly 30. The display 200 may be disposed on at least a portion of one surface (for example, an upper surface in FIG. 4) of the plate 240. The plate 240 may be formed in a shape corresponding to the display 200. For example, some areas of the plate 240 may be formed in a shape corresponding to a notch 204 of the display 200.

The bracket assembly 30 may include a first bracket 410, a second bracket 420, a hinge structure 540 disposed between the first bracket 410 and the second bracket 420, a hinge cover 530 to cover the hinge structure 540 when it is viewed from the outside, and a wire member 430 (for example, a flexible printed circuit board (FPC), a flexible printed circuit) crossing over the first bracket 410 and the second bracket 420.

In an embodiment of the disclosure, the bracket assembly 30 may be disposed between the plate 240 and the board unit 600. For example, the first bracket 410 may be disposed between a first area 201 of the display 200 and a first board 610. The second bracket 420 may be disposed between a second area 202 of the display 200 and a second board 620.

In an embodiment of the disclosure, the wire member 430 and at least a portion of the hinge structure 540 may be disposed inside the bracket assembly 30. The wire member 430 may be disposed in a direction (for example, an x-axis direction) of crossing over the first bracket 410 and the second bracket 420. The wire member 430 may be disposed in a direction (for example, the x-axis direction) perpendicular to a folding axis (for example, the y-axis or the folding axis A of FIG. 2) of a folding area 203 of the electronic device 101.

As mentioned above, the board unit 600 may include the first board 610 disposed on the first bracket 410 side, and the second board 620 disposed on the second bracket 420 side. The first board 610 and the second board 620 may be disposed in a space formed by the bracket assembly 30, the first housing structure 510, the second housing structure 520, the first rear surface cover 580, and the second rear surface cover 590. Components for implementing various functions of the electronic device 101 may be mounted on the first board 610 and the second board 620.

The first housing structure 510 and the second housing structure 520 may be assembled with each other to be coupled to both sides of the bracket assembly 30 with the display unit 20 being coupled to the bracket assembly 30. As will be described below, the first housing structure 510 and the second housing structure 520 may slide from both sides of the bracket assembly 30 and may be coupled with the bracket assembly 30.

In an embodiment of the disclosure, the first housing structure 510 may include a first rotation support surface 512, and the second housing structure 520 may include a second rotation support surface 522 corresponding to the first rotation support surface 512. The first rotation support surface 512 and the second rotation support surface 522 may include curved surfaces corresponding to curved surfaces included in the hinge cover 530.

In an embodiment of the disclosure, when the electronic device 101 is in a flat state (for example, the electronic device of FIG. 2), the first rotation support surface 512 and the second rotation support surface 522 may cover the hinge cover 530, such that the hinge cover 530 is not exposed to a rear surface (for example, the rear surface 535 of FIG. 2) of the electronic device 101 or is exposed to the minimum. On the other hand, when the electronic device 101 is in a folded state (for example, the electronic device of FIG. 2), the first rotation support surface 512 and the second rotation support surface 522 may rotate along the curved surface included in the hinge cover 530, such that the hinge cover 530 is exposed to the rear surface of the electronic device 101 to the maximum.

Figure 5:
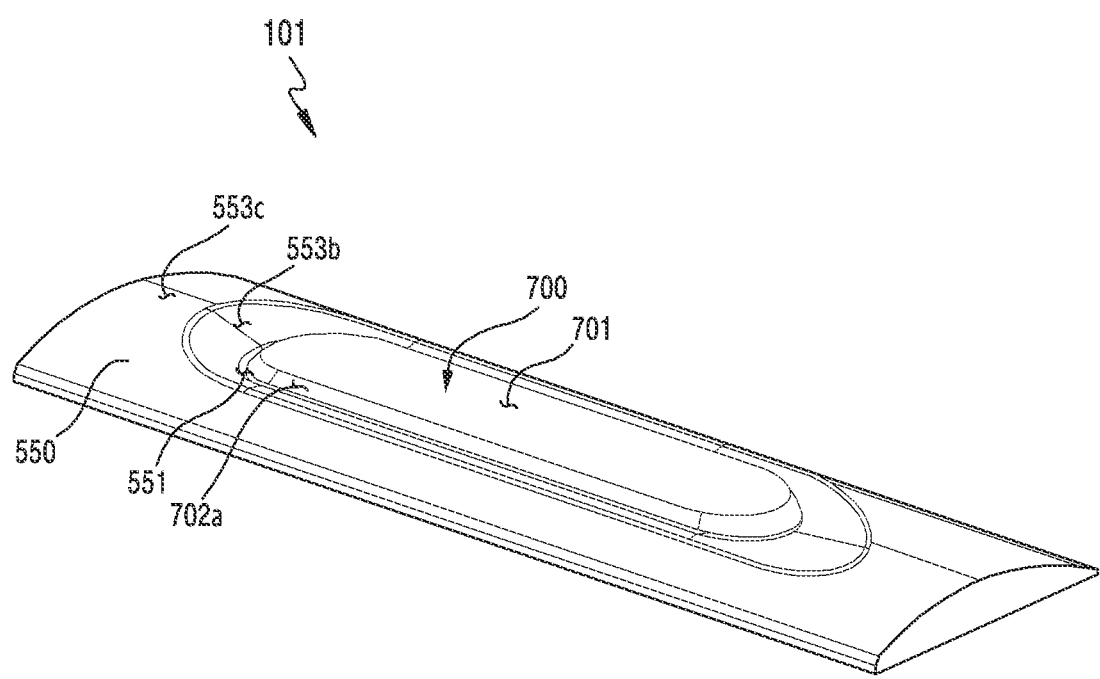
FIG. 5 is a perspective view of an electronic device according to an embodiment of the disclosure.
Figure 6:
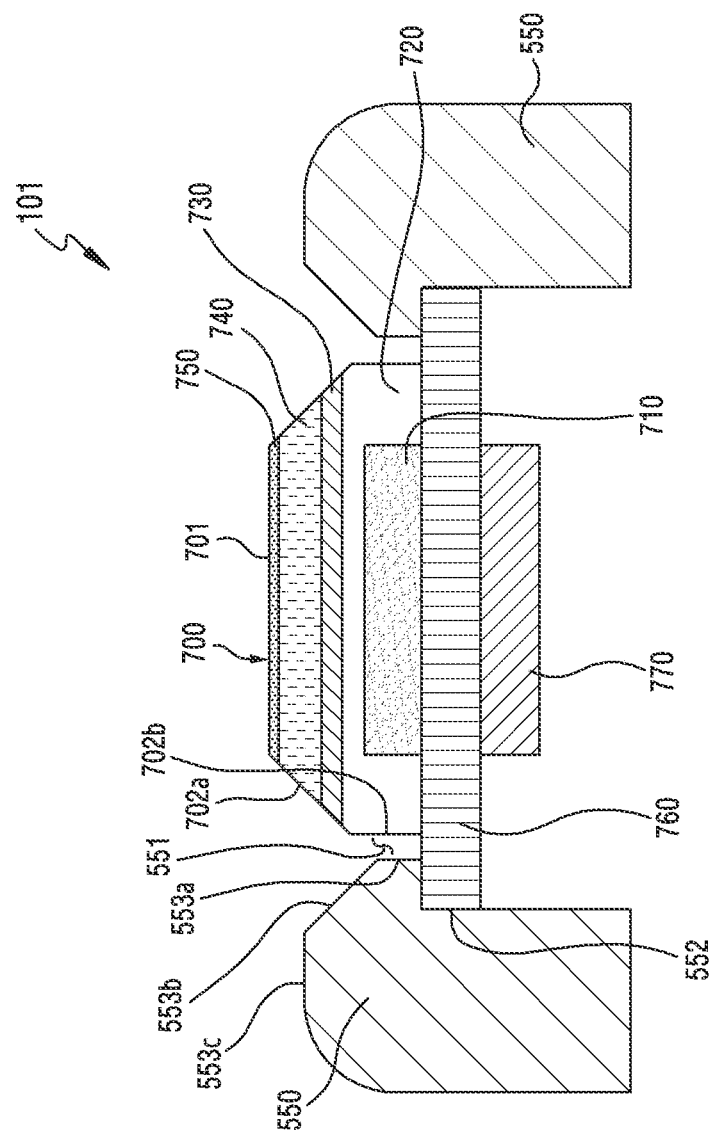
FIG. 6 is a cross-sectional view of an electronic device according to an embodiment of the disclosure.
Figure 7:
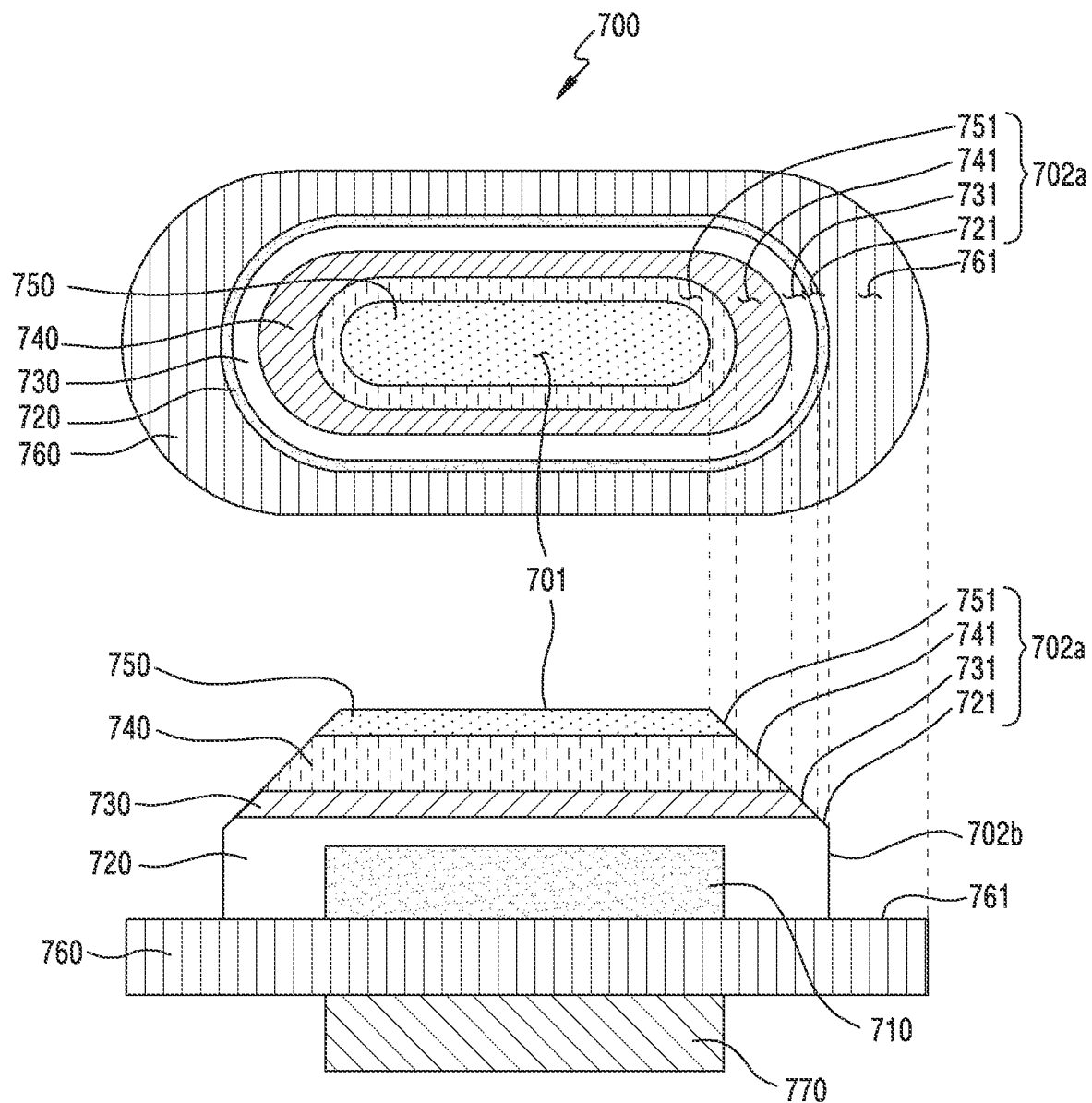
FIG. 7 is a top view and a cross-sectional view of a sensor module according to an embodiment of the disclosure.

FIG. 5 is a perspective view of an electronic device according to an embodiment of the disclosure. FIG. 6 is a cross-sectional view of an electronic device according to an embodiment of the disclosure. FIG. 7 is a top view and a cross-sectional view of a sensor module according to an embodiment of the disclosure.

Referring to FIGS. 5, 6, and 7, the electronic device 101 may include a sensor module 700 (for example, the sensor module 176 of FIG. 1) and a housing 550 (for example, the foldable housing 500 of FIG. 2).

According to an embodiment of the disclosure, the sensor module 700 may be disposed on a portion of the housing 550 to be seen from the outside. For example, the sensor module 700 may be disposed on a side surface (for example, the side surface 525 of FIGS. 2 and 3) of the electronic device 101. The sensor module 700 may have at least a portion included in a key input device (for example, the key input device 517 of FIGS. 2 and 3). For example, the sensor module 700 may be integrally formed with the key input device. According to an embodiment of the disclosure, the sensor module 700 may include an upper surface 701 of the sensor module, and a first processed surface 702a which has a designated slope with reference to the upper surface 701 of the sensor module. The first processed surface 702a may be formed along a periphery of the sensor module 700, being continuously connected with the upper surface 701 of the sensor module. For example, the first processed surface 702a may be extended from the upper surface 701 of the sensor module 700.

According to an embodiment of the disclosure, the sensor module 700 may include a biometric recognition sensor 710, a protection layer 720, an adhesive member 730, a ceramic layer 740, a substrate layer 760, and a flexible printed circuit board (FPCB) 770. The biometric recognition sensor 710, the protection layer 720, the adhesive member 730, the ceramic layer 740, the substrate layer 760, and the FPCB 770 may be sequentially laminated to form the sensor module 700.

The biometric recognition sensor 710 may include at least one of a fingerprint recognition sensor or a heart rate measurement (HRM) sensor. The biometric recognition sensor 710 may be disposed on the substrate layer 760. The fingerprint recognition sensor may acquire biometric information from an external object. For example, the fingerprint recognition sensor may detect user's fingerprint and may generate an electric signal or a data value corresponding to a detected state. The fingerprint recognition sensor may use at least one of an ultrasonic method, an optical or capacitance method, an ultrasonic method. The fingerprint recognition sensor may include an optical module or may include an ultrasonic oscillation unit and a reception unit. When an optical method is used, the fingerprint recognition sensor may acquire an image of a fingerprint by using a charge coupled device (CCD)/complementary metal-oxide semiconductor (CMOS) or an optical sensor, such as a photodiode. When an ultrasonic method is used, the fingerprint recognition sensor may acquire fingerprint information by converting a fingerprint image reflected by ultrasonic waves into an electric signal. To recognize valleys and ridges of user's fingerprint, an ultrasonic sensor may generate ultrasonic waves and receive reflected waves, thereby imaging as electric pixels. An optical fingerprint sensor may acquire a fingerprint image by shooting a fingerprint detection area. According to an embodiment of the disclosure, the biometric recognition sensor 710 may include an integrated circuit to acquire biometric information, such as a sensing circuit. The integrated circuit may be manufactured by forming a circuit pattern on a silicon wafer, which is formed by cutting a silicon ingot into thin slices and performing a surface treatment process, such as grinding, oxidizing, or the like, through a process, such as photo lithography, etching, deposition, and ion implantation, and by cutting the circuit pattern by a constant size. According to an embodiment of the disclosure, the protection layer 720 may be disposed on the substrate layer 760 and the biometric recognition sensor 710, and may be formed to enclose the biometric recognition sensor 710. The protection layer 720 may include an epoxy molding compound (EMC). The protection layer 720 may be formed to enclose the biometric recognition sensor 710 and to protect the biometric recognition sensor 710 from an external environment.

According to an embodiment of the disclosure, the UV (UV) curing adhesive member 730 may be disposed on the protection layer 720. The UV curing adhesive member 730 may be instantaneously cured at room temperature in reaction to UV rays. The UV curing adhesive member 730 may have viscosity of 2 cps to 3000 cps before being cured and may have hardness of 15 shore B to 80 shore B after being cured. The UV curing adhesive member 730 can re-adhere after being detached after being cured. The UV curing adhesive member 730 may be 1 um to 30 um thick. Due to the instantaneous curing characteristic of the UV curing adhesive member 730, time required to process can be more reduced than a thermosetting adhesive member. Since the UV curing adhesive member 730 has low hardness even after being cured, breakage of the sensor module caused by a process after curing or an impact can be prevented. Since the thermosetting adhesive member requires an environment of high temperature, high pressure to be cured, an outer surface of the sensor module may be curved, cracked by a high-temperature environment. Since the UV curing adhesive member 730 does not require the environment of high temperature, high pressure to be cured, deformation of the surface of the sensor module 700 which is caused by exposure to the environment of high temperature for a long time can be prevented.

According to an embodiment of the disclosure, the ceramic layer 740 may be attached to the protection layer 720 by the UV curing adhesive member 703. The ceramic layer 740 may allow UV rays to pass therethrough to cure the UV curing adhesive member 730. For example, the ceramic layer 740 may have a UV transmissivity of 0.01% to 70%. The UV curing adhesive member 730 may be cured in reaction to UV rays passing through the ceramic layer 740, such that the ceramic layer 740 is attached to one surface of the protection layer 720. According to an embodiment of the disclosure, the ceramic layer 740 may include metallic oxide-based minerals. For example, the ceramic layer 740 may include at least one of zirconia (ZrO2), alumina (Al2O3), and/or glass (SiO2). According to an embodiment of the disclosure, the ceramic layer 740 may have thickness of 0.05 mm to 0.5 mm.

According to an embodiment of the disclosure, the ceramic layer 740 may further include a coating layer 750 on one surface thereof According to an embodiment of the disclosure, the coating layer 750 of the ceramic layer 740 may include a color coating layer for representing color. The coating layer 750 may be deposited on the ceramic layer 740, first, in order to prevent the biometric recognition sensor 710 from being exposed to a high temperature or high pressure environment while the coating layer 750 is deposited. For example, the ceramic layer 740 having the coating layer 750 deposited thereon may be disposed on the UV curing adhesive member 730. According to another embodiment of the disclosure, the color coating layer may be formed on one surface of the ceramic layer 740 by printing, painting, or the like. The coating layer 750 may be coated with thickness of 0.1 um to 1 um. In another example, the coating layer 750 may include an anti-fingerprint (AF) layer to prevent contamination. The AF layer can prevent a contamination material, such as a fingerprint from being attached to the sensor module 700. In an embodiment of the disclosure, the coating layer 750 may include the color coating layer and/or the AF layer.

According to an embodiment of the disclosure, even when the coating layer 750 is applied to one surface of the ceramic layer 740, the ceramic layer 740 including the coating layer 750 may have the UV transmissivity of 0.01 to 70%. Unlike the above description, the ceramic layer 740 may utilize natural color of ceramic and may be attached to the protection layer 720 without applying the coating layer 750.

According to an embodiment of the disclosure, the biometric recognition sensor 710 and the protection layer 720 may be disposed on the substrate layer 760. The substrate layer 760 may be substantially parallel to the ceramic layer 740. According to an embodiment of the disclosure, the substrate layer 760 may overlap a periphery of an opening 551 formed on the housing 550 at least in part.

According to an embodiment of the disclosure, the FPCB 770 may be attached to one surface of the substrate layer 760. The FPCB 770 may be electrically connected with the sensor module 700 and a processor (for example, the processor 120 of FIG. 1) of the electronic device 101. The processor of the electronic device 101 and the sensor module 700 may exchange signals or data through the FPCB 770. According to an embodiment of the disclosure, the FPCB 770 may be formed with a material having flexibility, and may be foldable or bendable. For example, a conductive thin film pattern, such as a copper thin film may be formed on a polyimide (PI) film, but this should not be considered as limiting.

According to an embodiment of the disclosure, the upper surface 701 of the sensor module 700 may be formed substantially in parallel with the biometric recognition sensor 710. The upper surface 701 of the sensor module 700 may be formed with the ceramic layer 740 or the coating layer 750. For example, the layer that is laminated on the uppermost layer of the sensor module 700 may be the ceramic layer 740 or the coating layer 750.

According to an embodiment of the disclosure, the side surface of the sensor module 700 may include the first processed surface 702a and a second processed surface 702b. The first processed surface 702a may be formed as portions of the coating layer 750, the ceramic layer 740, the adhesive member 730, and the protection layer 720. The first processed surface 702a may have a designated slope with reference to the upper surface 701 of the sensor module. According to an embodiment, the first processed surface 702a may be formed along the periphery of the sensor module 700. For example, the first processed surface 702a may be extended by a different slope from the upper surface 701 of the sensor module in a direction of going away from the center of the upper surface 701 of the sensor module. When the coating layer 750 is not applied to the ceramic layer 740 unlike the above description, the first processed surface 702a may be formed as portions of the ceramic layer 740, the adhesive member 730, and the protection layer 720. The first processed surface 702a may have a designated slope with reference to the upper surface 701 of the sensor module.

According to an embodiment of the disclosure, the sensor module 700 includes the first processed surface 702a on a portion of the periphery including the ceramic layer 740, so that a damage caused by an impact can be prevented and a smooth manipulation can be provided to a user. For example, the first processed surface 702a can prevent a sharp edge of the ceramic layer from giving a rough touch to the user by being exposed to the outside, or can prevent the sensor module 700 from being easily broken by an external impact.

According to an embodiment of the disclosure, the second processed surface 702b may be formed as the other portion of the protection layer 720 that is not included in the first processed surface 702a. The second processed surface 702b may be extended from the first processed surface 702a to the substrate layer 760 in a direction substantially perpendicular to the upper surface 701 of the sensor module. According to an embodiment of the disclosure, the second processed surface 702b may be spaced apart from the housing 550.

According to an embodiment of the disclosure, the housing 550 may include the opening 551 to have the sensor module 700 disposed therein. The opening 551 may be formed on a side surface of the housing 550 of the electronic device 101. For example, a key input device (for example, the key input device 517 of FIG. 3) disposed on the side surface of the housing 550 may include the above-described sensor module 700. The opening 551 may be formed in a shape corresponding to the shape of the sensor module 700, and at least a portion of the sensor module 700 may be inserted into the opening 551. The sensor module 700 having at least a portion inserted into the opening 551 may be seen from the outside of the electronic device 101 through the opening 551. For example, the sensor module 700 may be seen on the side surface of the electronic device 101 from the outside through the opening 551 formed on the side surface of the housing 550. According to an embodiment of the disclosure, the opening 551 may be formed to be spaced apart from the periphery of the sensor module 700. When the sensor module 700 is integrally formed with a physical button (for example, the key input device 517 of FIG. 2), the electronic device 101 may provide an enhanced manipulation to the user due to a space distanced between the opening 551 and the sensor module 700. According to an embodiment of the disclosure, a periphery of the opening 551 may overlap the substrate layer 760. The housing 550 may form a contact surface 552 through which the substrate layer 760 and the housing 550 are in contact with each other, due to the overlapping area. The sensor module 700 may be disposed to have at least a portion inserted into the opening 551, and to have at least a portion of the substrate layer 760 of the sensor module 700 be in contact with the housing 550.

According to an embodiment of the disclosure, the housing 550 may include a first surface 553a which is formed along the periphery of the opening 551, a second surface 553b which is extended from the first surface 553a, and a third surface 553c which is extended from the second surface 553b. According to an embodiment of the disclosure, the first surface 553a may be in contact with one surface of the substrate layer 760, and may be extended from the contact surface 552 between the housing 550 and the substrate layer 760. The first surface 553a may be spaced apart from the second processed surface 702b, and may be extended in a direction substantially perpendicular to the substrate layer 760. The second surface 553b may have a designated slope with reference to the first surface 553a, and may be extended in a direction of going away from the sensor module 700. The third surface 553c may be extended from the second surface 553b in a direction substantially perpendicular to the first surface 553a.

According to an embodiment of the disclosure, when the sensor module 700 is integrally formed with a physical button (for example, the key input device 517 of FIG. 2), the electronic device 101 may have the second surface 553b formed on the housing 550, so that an enhanced manipulation can be provided to the user.

Referring to FIG. 7, the sensor module 700 may include a biometric recognition sensor 710, a protection layer 720, a UV curing adhesive member 730, a ceramic layer 740, a substrate layer 760, an FPCB 770, a first processed surface 702a, and a second processed surface 702b.

According to an embodiment of the disclosure, the biometric recognition sensor 710 may be disposed on the substrate layer 760.

According to an embodiment of the disclosure, the protection layer 720 may be disposed on the substrate layer 760 and may be formed to enclose the biometric recognition sensor 710. The protection layer 720 may protect the biometric recognition sensor 710 by preventing the biometric recognition sensor 710 from being exposed to an external environment.

According to an embodiment of the disclosure, the UV curing adhesive member 730 may be disposed on the protection layer 720. The UV curing adhesive member 730 may make the ceramic layer 740 adhere to the protection layer 720.

According to an embodiment of the disclosure, the ceramic layer 740 may adhere to the protection layer 720 by the UV curing adhesive member 730. To cure the UV curing adhesive member 730, the ceramic layer 740 can allow UV rays to pass therethrough. According to an embodiment of the disclosure, the ceramic layer 740 may further include a coating layer 750 on one surface thereof The coating layer 750 may include an AF layer to prevent contamination and/or a color coating layer to represent color. Unlike the above description, the ceramic layer 740 may be disposed on the protection layer 720 without applying the coating layer 750.

According to an embodiment of the disclosure, the substrate layer 760 may be disposed on one surface of the biometric recognition sensor 710 to support the biometric recognition sensor 710 and the protection layer 720. A portion of a periphery surface 761 of the substrate layer 760 may overlap a periphery of an opening (for example, the opening 551 of FIG. 6) of a housing (for example, the housing 550 of FIG. 6). At least a portion of the periphery surface 761 of the substrate layer 760 may be hidden by the housing when the sensor module 700 is viewed from above.

According to an embodiment of the disclosure, the FPCB 770 may be disposed on the opposite surface of the surface of the substrate layer 760 that contacts the biometric recognition sensor 710. The FPCB 770 may be electrically connected with the sensor module 700.

According to an embodiment of the disclosure, the first processed surface 702a may include a periphery surface 751 of the coating layer 750, a periphery surface 741 of the ceramic layer 740, a periphery surface 731 of the UV curing adhesive member 730, and a periphery surface 721 of one portion of the protection layer 720. According to an embodiment of the disclosure, the first processed surface 702a may have a designated slope with reference to an upper surface 701 of the sensor module including one surface of the ceramic layer 740. The periphery surface 751 of the coating layer 750, the periphery surface 741 of the ceramic layer 740, the periphery surface 731 of the UV curing adhesive member 730, and the periphery surface 721 of one portion of the protection layer 720, which form the first processed surface 702a, may be continuously connected. According to an embodiment of the disclosure, the coating layer 750 may be formed such that an area of a contact surface between the coating layer 750 and the ceramic layer 740 is larger than an area of a surface formed by the upper surface 701 of the sensor module. The ceramic layer 740 may be formed such that an area of a contact surface between the ceramic layer 740 and the UV curing adhesive member 730 is larger than the area of the contact surface between the ceramic layer 740 and the coating layer 750. The UV curing adhesive member 730 may be formed such that an area of a contact surface between the UV curing adhesive member 740 and the protection layer 720 is larger than the area of the contact surface between the UV curing adhesive member 730 and the ceramic layer 740. According to an embodiment of the disclosure, the first processed surface 702a may be extended in a direction of going away from the center of the upper surface 701 of the sensor module. Unlike the above description, the ceramic layer 740 may not include the coating layer 750, and thus, the first processed surface 702a may be formed with the periphery surface 741 of the ceramic layer 740, the periphery surface 731 of the UV curing adhesive member 730, and the periphery surface 721 of one portion of the protection layer 720.

According to an embodiment of the disclosure, the second processed surface 702b may form with the other periphery surface of the protection layer 720 except for the periphery surface 721 of the protection layer 720. The second processed surface 702b may be connected to the first processed surface 702a in a direction substantially perpendicular to the upper surface 701 of the sensor module, and may be extended to the substrate layer 760. According to an embodiment of the disclosure, the side surface of the sensor module 700 may include the first processed surface 702a and the second processed surface 702b.

According to an embodiment of the disclosure, the periphery of the ceramic layer 740 may include two straight lines which face each other and the other periphery connecting the two straight lines when the sensor module 700 is viewed from above. The other periphery may be formed with a curved line. For example, the other periphery may be formed in a semicircular shape, and the center of the semicircle may be connected with the two straight lines to overlap the ceramic layer 740 (the semicircular periphery curves outwards). Unlike the above description, the shape of the ceramic layer 740 may be oval or may be a rectangle having a rounded corner when the sensor module 700 is viewed from above. The shapes of the protection layer 720, the UV curing adhesive member 730, the coating layer 750, and the substrate layer 760 may be the same as or similar to the shape of the ceramic layer 740 when the sensor module 700 is viewed from above. According to an embodiment of the disclosure, the biometric recognition sensor 710 may have a different shape from that of the ceramic layer 740 when the sensor module 700 is viewed from above.

According to an embodiment of the disclosure, the protection layer 720, the UV curing adhesive member 730, the ceramic layer 740, and the substrate layer 760 may have center points disposed at the same position when the sensor module 700 is viewed from above, and the sensor module 700 may be formed in such a shape that an area increases linearly or nonlinearly from the upper surface 701 of the sensor module toward the substrate layer 760.

Figure 8A:
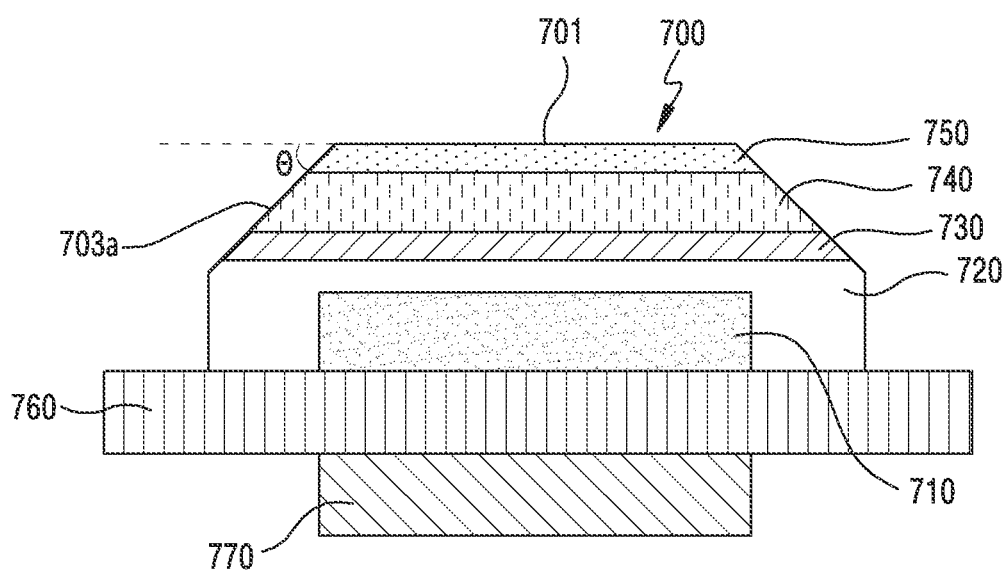
FIG. 8A is a cross-sectional view of a sensor module according to an embodiment of the disclosure.
Figure 8B:
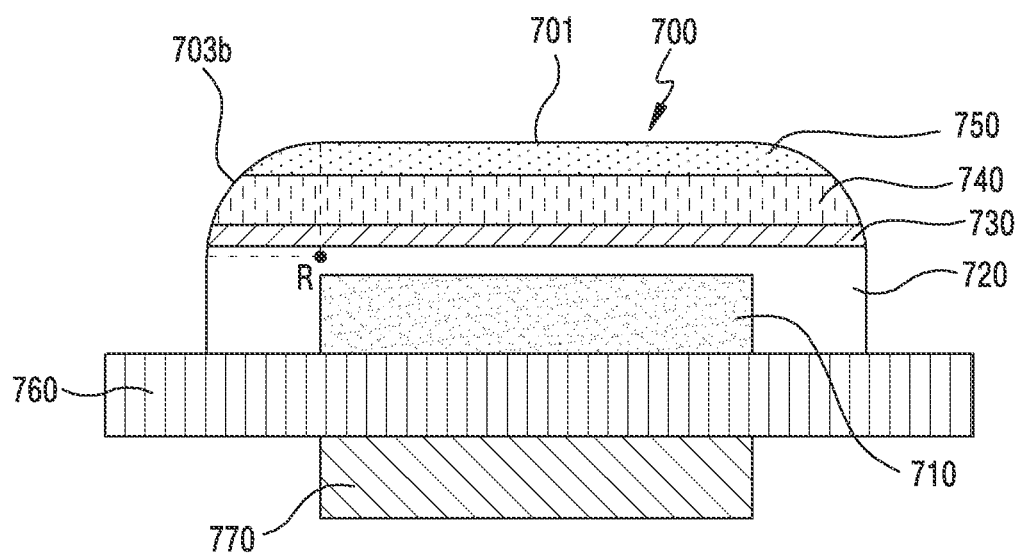
FIG. 8B is a cross-sectional view of a sensor module according to an embodiment of the disclosure.

FIGS. 8A and 8B are cross-sectional views of a sensor module according to various embodiments of the disclosure.

Referring to FIGS. 8A and 8B, the sensor module 700 may include a biometric recognition sensor 710, a protection layer 720, a UV curing adhesive member 730, a ceramic layer 740, a substrate layer 760, an FPCB 770, a chamfer surface 703a (for example, the first processed surface 702a of FIG. 6), and a curved surface 703b.

According to an embodiment of the disclosure, the biometric recognition sensor 710 may be disposed on the substrate layer 760.

According to an embodiment of the disclosure, the protection layer 720 may be disposed on the substrate layer 760 and may be formed to enclose the biometric recognition sensor 710. The protection layer 720 may protect the biometric recognition sensor 710 by preventing the biometric recognition sensor 710 from being exposed to an external environment.

According to an embodiment of the disclosure, the UV curing adhesive member 730 may be disposed on the protection layer 720. The UV curing adhesive member 730 may make the ceramic layer 740 adhere to the protection layer 720.

According to an embodiment of the disclosure, the ceramic layer 740 may adhere to the protection layer 720 by the UV curing adhesive member 730. To cure the UV curing adhesive member 730, the ceramic layer 740 may allow UV rays to pass therethrough.

According to an embodiment of the disclosure, the ceramic layer 740 may further include a coating layer 750 on one surface thereof The coating layer 750 may include an AF layer to prevent contamination and/or a color coating layer to represent color. Unlike the above description, the ceramic layer 740 may be disposed on the protection layer 720 without applying the coating layer 750.

According to an embodiment of the disclosure, the substrate layer 760 may be in contact with one surface of the biometric recognition sensor 710 to support the biometric recognition sensor 710 and the protection layer 720.

According to an embodiment of the disclosure, the FPCB 770 may be disposed on the opposite surface of the surface of the substrate layer 760 that contacts the biometric recognition sensor 710.

Referring to FIG. 8A, the chamfer surface 703a may be formed as portions of the coating layer 750, the ceramic layer 740, the UV curing adhesive member 730, and the protection layer 720. According to an embodiment of the disclosure, the chamfer surface 703a may have a designated slope (or angle) θ with reference to an upper surface 701 of the sensor module. For example, the designated slope θ may be 10° to 70°.

Referring to FIG. 8B, the curved surface 703b may be formed as portions of the coating layer 750, the ceramic layer 740, the UV curing adhesive member 730, and the protection layer 720. According to an embodiment of the disclosure, the curved surface 703b may form a curved surface with reference to the upper surface 701 of the sensor module. For example, the curved surface 703b may have a designated radius of curvature R. The designated radius of curvature R may be 0.08 mm to 0.5 mm.

Since the ceramic layer 740 may not include the coating layer 750 unlike the above description, the chamfer surface 703a and the curved surface 703b may be formed as portions of the ceramic layer 740, the UV curing adhesive member 730, and the protection layer 720.

Figure 9A:
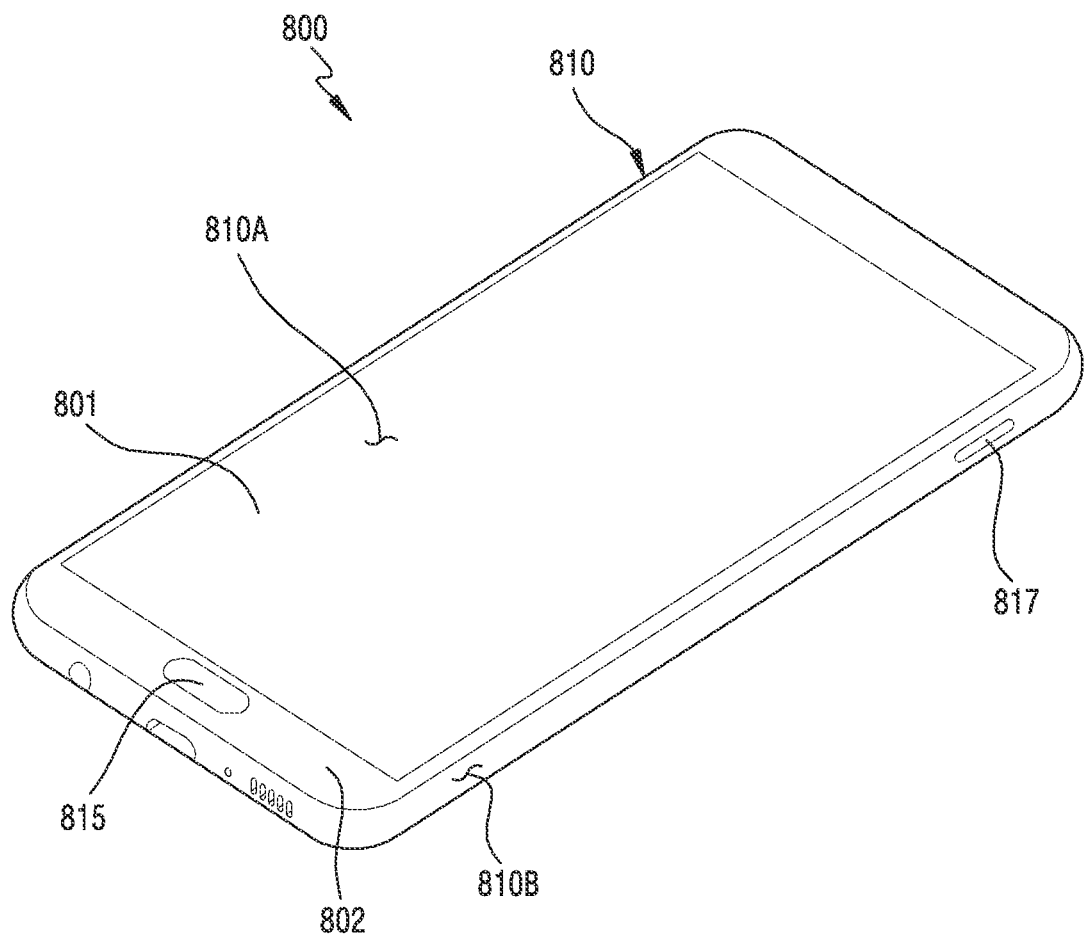
FIG. 9A is a perspective view illustrating an electronic device when it is viewed from a front according to an embodiment of the disclosure.
Figure 9B:
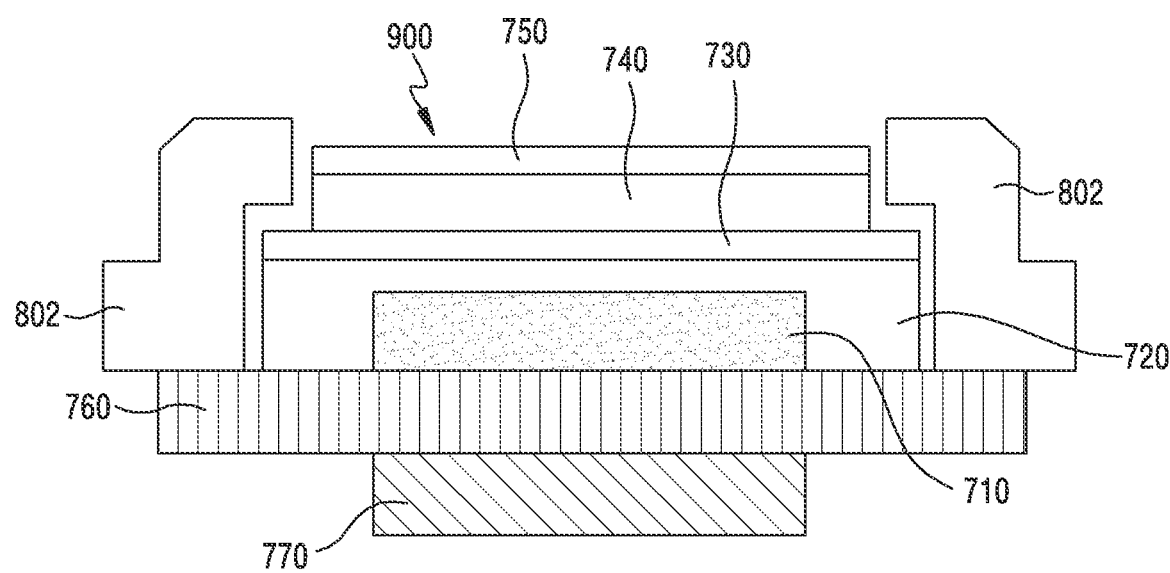
FIG. 9B is a cross-sectional view of an electronic device including a sensor module according to an embodiment of the disclosure.

FIG. 9A is a perspective view of an electronic device when it is viewed from a front according to an embodiment of the disclosure. FIG. 9B is a cross-sectional view of an electronic device including a sensor module according to an embodiment of the disclosure.

Referring to FIGS. 9A and 9B, the electronic device 800 according to an embodiment may include a housing 810, a display 801, a side surface key input device 817, a front surface key input device 815, and a sensor module 900.

According to an embodiment of the disclosure, the housing 810 may include a front surface 810A, a rear surface (not shown) facing the front surface 810A, and a side surface 810B enclosing a space between the front surface 810A and the rear surface (not shown). According to an embodiment of the disclosure, the front surface 810A may be formed by a front surface plate 802 (for example, a glass plate including various coating layers, or a polymer plate) having at least a portion substantially transparent.

According to an embodiment of the disclosure, the display 801 may be disposed in contact with the front surface plate 802. The display 801 may be viewable through a substantial portion of the front surface plate 802. According to an embodiment of the disclosure, the display 801 may be formed with a plurality of layers. For example, the display 801 may include a thin film transistor (TFT) layer, an electrode layer, an organic layer, or a pixel layer. The display 801 may emit light for transmitting information to a user from pixels, and the emitted light may be transmitted to the outside through the transparent front surface plate 802.

According to an embodiment of the disclosure, the side surface key input device 817 may be disposed on the side surface 810B of the housing 810. According to an embodiment of the disclosure, the side surface key input device 817 may include a sensor module (for example, the sensor module 700 of FIG. 5).

According to an embodiment of the disclosure, the front surface key input device 815 may be disposed on the front surface 810A of the housing 810. According to an embodiment of the disclosure, the front surface key input device 815 may include the sensor module 900.

According to an embodiment of the disclosure, the sensor module 900 may include a biometric recognition sensor 710, a protection layer 720, an adhesive member 730, a ceramic layer 740, a substrate layer 760, and an FPCB 770.

According to an embodiment of the disclosure, the biometric recognition sensor 710 may be disposed on the substrate layer 760. The biometric recognition sensor 710 may include a fingerprint recognition sensor or a heart rate measurement sensor.

According to an embodiment of the disclosure, the protection layer 720 may be disposed on the substrate layer 760, and may be formed to enclose the biometric recognition sensor 710.

According to an embodiment of the disclosure, the UV curing adhesive member 730 may be disposed on the protection layer 720. The UV curing adhesive member 730 may make the ceramic layer 740 adhere to the protection layer 720.

According to an embodiment of the disclosure, the ceramic layer 740 may adhere to the protection layer 720 by the UV curing adhesive member 730. To cure the UV curing adhesive member 730, the ceramic layer 740 may allow UV rays to pass therethrough. For example, the ceramic layer 740 may have a UV transmissivity of 0.01% to 70%. According to an embodiment of the disclosure, the ceramic layer 740 may further include a coating layer 750 on one surface thereof. The coating layer 750 may include at least one of a color layer to represent color or an AF layer to prevent contamination.

According to an embodiment of the disclosure, the substrate layer 760 may be disposed on one surface of the biometric recognition sensor 710 to support the biometric recognition sensor 710 and the protection layer 720. The substrate layer 760 may be disposed to have at least a portion contacting the housing 810.

According to an embodiment of the disclosure, the FPCB 770 may be disposed on the opposite surface of the surface of the substrate layer 760 that contacts the biometric recognition sensor 710. The FPCB 770 may be electrically connected with the sensor module 700.

According to an embodiment of the disclosure, the sensor module 900 may be disposed on the front surface 810A of the electronic device 800. For example, the front surface key input device 815 may include the sensor module 900. A side surface of the sensor module 900 may be hidden by the front surface plate 802. A protrusion may protrude from at least one area of the front surface plate 802 along the side surface of the sensor module 900 to enclose the side surface of the sensor module 900. The sensor module 900 may have at least a portion inserted into an opening formed on the front surface plate 802. One surface of the coating layer 750 may be seen from the outside through the opening formed on the front surface plate 802.

Figure 10:
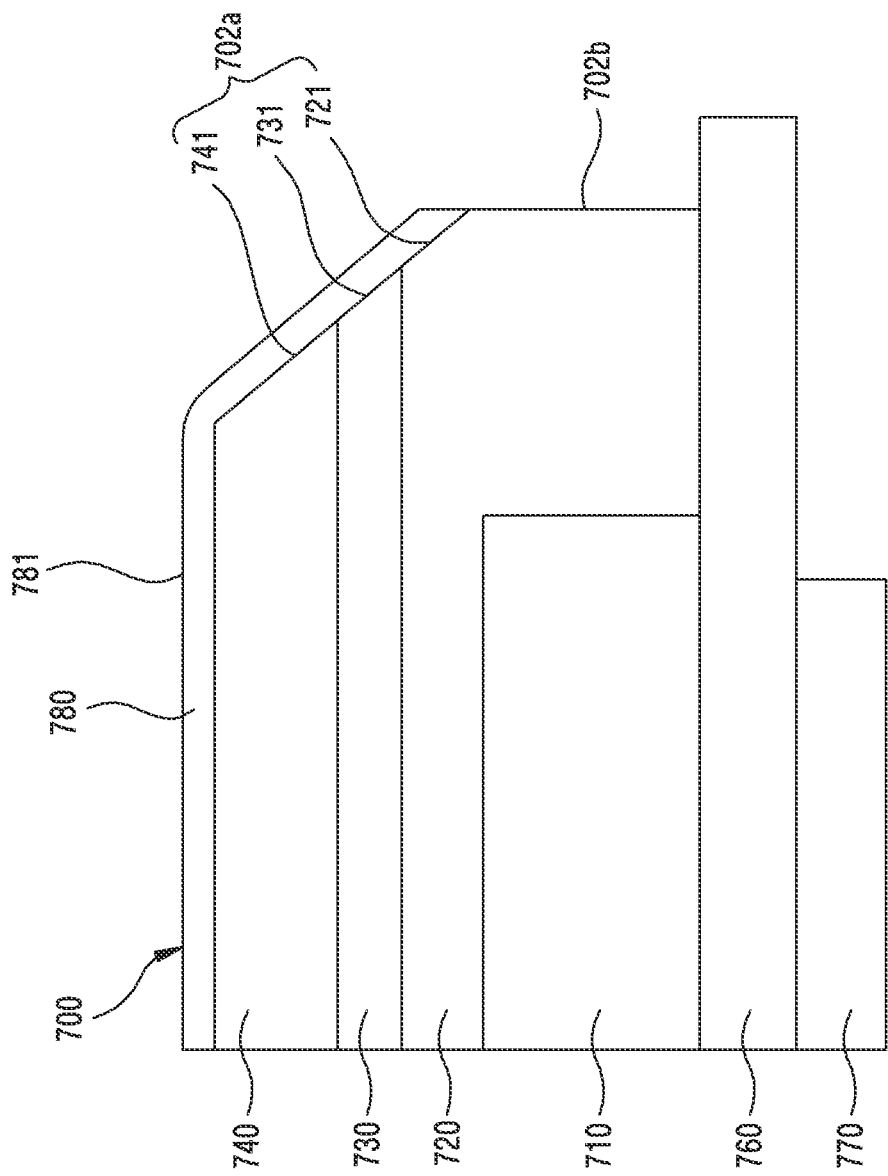
FIG. 10 is a cross-sectional view of a sensor module according to an embodiment of the disclosure.

FIG. 10 is a cross-sectional view of a sensor module according to an embodiment of the disclosure.

Referring to FIG. 10, the sensor module 700 may include a biometric recognition sensor 710 (for example, a fingerprint recognition sensor or an HRM sensor), a protection layer 720, a UV curing adhesive member 730, a ceramic layer 740, a substrate layer 760, an FPCB 770, and an additional coating layer 780.

According to an embodiment of the disclosure, the biometric recognition sensor 710 may be disposed on the substrate layer 760.

According to an embodiment of the disclosure, the protection layer 720 may be disposed on the substrate layer 760, and may be formed to enclose the biometric recognition sensor 710. The protection layer 720 may protect the biometric recognition sensor 710 by preventing the biometric recognition sensor 710 from being exposed to an external environment.

According to an embodiment of the disclosure, the UV curing adhesive member 730 may be disposed on the protection layer 720. The UV curing adhesive member 730 may make the ceramic layer 740 adhere to the protection layer 720.

According to an embodiment of the disclosure, the ceramic layer 740 may adhere to the protection layer 720 by the UV curing adhesive member 730. To cure the UV curing adhesive member 730, the ceramic layer 740 may allow UV rays to pass therethrough.

According to an embodiment of the disclosure, the substrate layer 760 may be disposed on one surface of the biometric recognition sensor 710 to support the biometric recognition sensor 710 and the protection layer 720. A portion of a periphery surface 761 of the substrate layer 760 may overlap a periphery of an opening (for example, the opening 551 of FIG. 6) of a housing (for example, the housing 550 of FIG. 6).

According to an embodiment of the disclosure, the FPCB 770 may be disposed on the opposite surface of the surface of the substrate layer 760 that contacts the biometric recognition sensor 710. The FPCB 770 may be electrically connected with the sensor module 700.

According to an embodiment of the disclosure, a first processed surface 702a may include a periphery surface 741 of the ceramic layer, a periphery surface 731 of the UV curing adhesive member, and a periphery surface 721 of one portion of the protection layer. According to an embodiment of the disclosure, the first processed surface 702a may have a slope with reference to the ceramic layer 740. In an embodiment of the disclosure, the periphery surface 741 of the ceramic layer, the periphery surface 731 of the UV curing adhesive member, and the periphery surface 721 of one portion of the protection layer, which form the first processed surface 702a, may be continuously connected. According to an embodiment of the disclosure, the first processed surface 702a may be formed such that an area of a contact surface between the UV curing adhesive member 730 and the protection layer 720 is larger than an area of a contact surface between the UV curing adhesive member 730 and the ceramic layer 740. According to an embodiment of the disclosure, the first processed surface 702a may be extended in a direction of going away from the center of the ceramic layer 740.

According to an embodiment of the disclosure, a second processed surface 702b may be formed on the other periphery surface of the protection layer 720 except for the periphery surface 721 of one portion of the protection layer. The second processed surface 702b may be connected to the first processed surface 702a in a direction substantially perpendicular to the ceramic layer 740, and may be extended to the substrate layer 760.

According to an embodiment of the disclosure, the additional coating layer 780 may be applied onto one surface 782 of the ceramic layer 740 and the first processed surface 702a. An upper surface of the additional coating layer 780 may be formed along the one surface 782 of the ceramic layer 740 and the first processed surface 702a. Since a separate process is not performed after the additional coating layer 780 is applied, the upper surface 781 of the additional coating layer that is seen from the outside may include a curved portion. According to an embodiment of the disclosure, the side surface of the sensor module 700 may include the processed surface 702b. According to an embodiment of the disclosure, the additional coating layer 780 may include an AF layer to prevent contamination or a color coating layer to represent color. According to an embodiment of the disclosure, the additional coating layer 780 may allow UV rays to pass therethrough. For example, even when the additional coating layer 780 is applied, the UV transmissivity of the ceramic layer 740 and the additional coating layer 780 may be 0.01% to 70%.

Figure 11A:
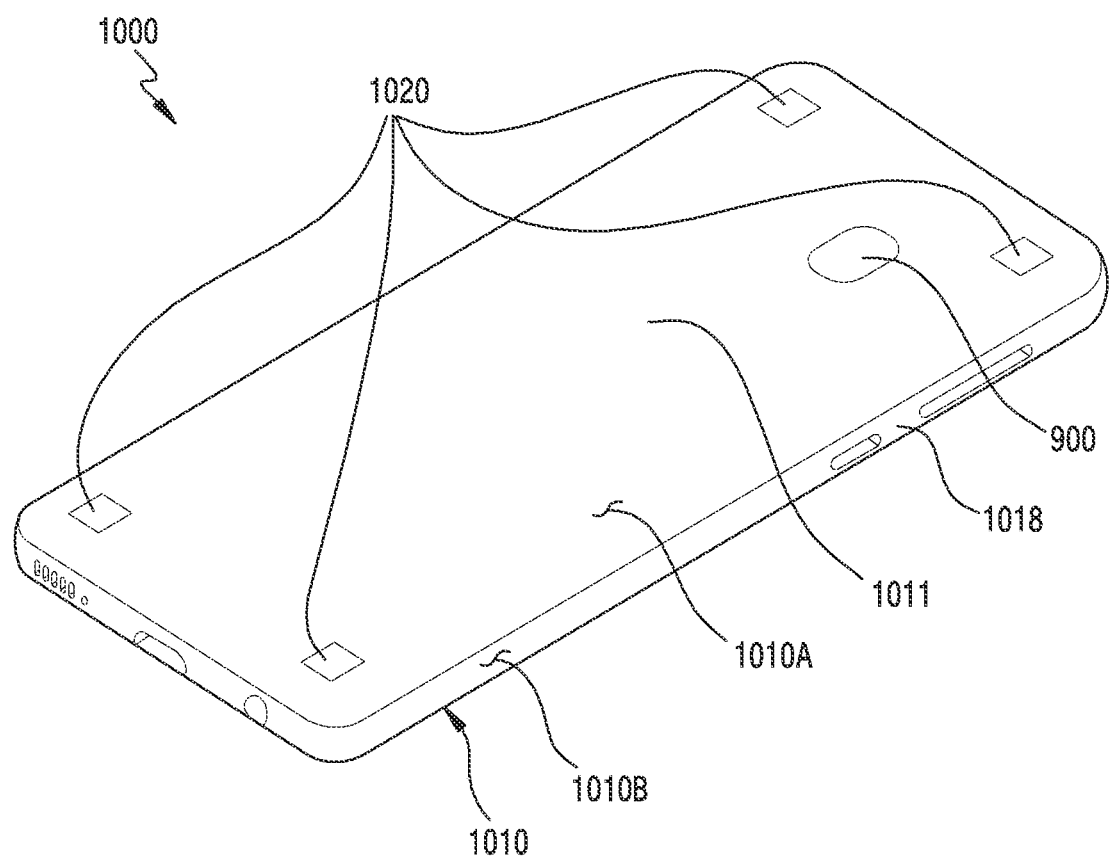
FIG. 11A is a perspective view illustrating an electronic device when it is viewed from a back according to an embodiment of the disclosure.
Figure 11B:
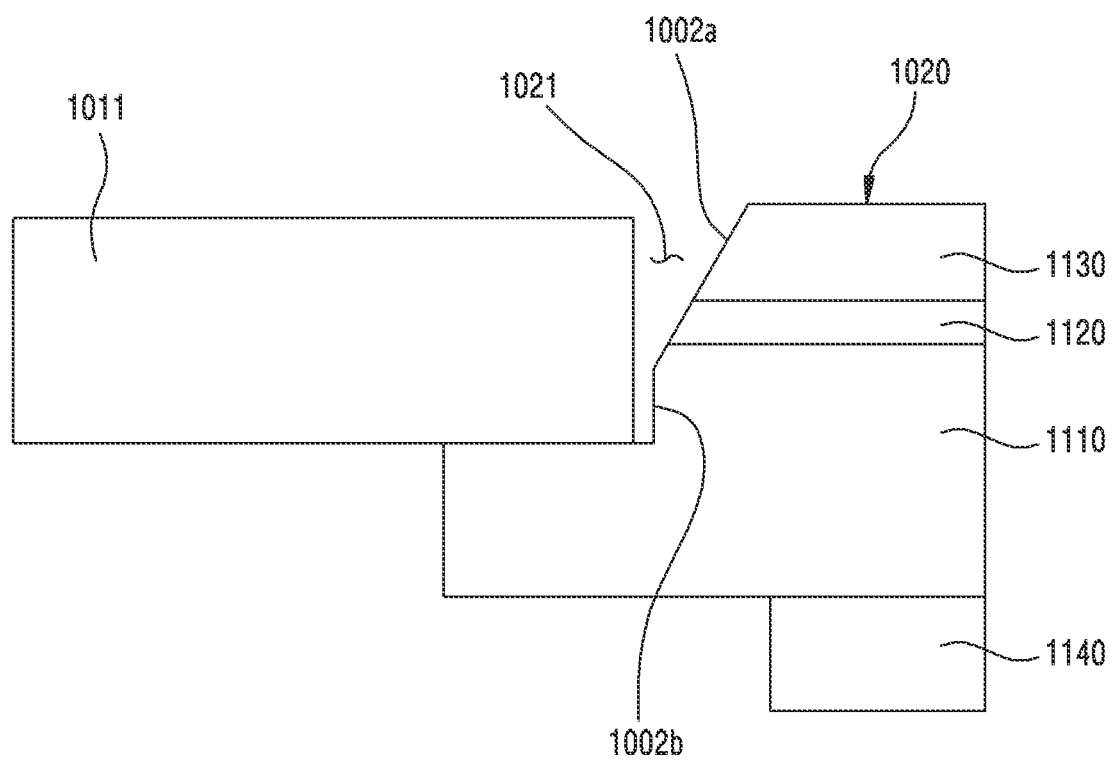
FIG. 11B is a cross-sectional view of an electronic device including an antenna module according to an embodiment of the disclosure.

FIG. 11A is a perspective view illustrating an electronic device when it is viewed from a back according to an embodiment of the disclosure. FIG. 11B is a cross-sectional view of an electronic device including an antenna module according to an embodiment of the disclosure. FIG. 11C is a cross-sectional view of an electronic device including a sensor module according to an embodiment of the disclosure.

Referring to FIG. 11A, the electronic device 1000 may include a housing 1010, a sensor module 900, and an antenna module 1020 (for example, the antenna module 197 of FIG. 1).

According to an embodiment of the disclosure, the electronic device 1000 may include the housing 1010 including a front surface (not shown), a rear surface 1010A, and a side surface 1010B enclosing a space between the front surface and the rear surface 1010A.

According to an embodiment of the disclosure, the rear surface 1010A may be formed by a substantially opaque rear surface plate 1011. The rear surface plate 1011 may be formed by, for example, coated or colored glass, ceramic, polymer, metal (for example, aluminum, stainless steel (STS), or magnesium), or a combination of at least two of the above-mentioned materials. According to an embodiment of the disclosure, the rear surface plate 1011 may include a curved portion which is bent from the rear surface 1010A toward the front surface on at least one side end portion, and is seamlessly extended. According to an embodiment of the disclosure, the rear surface plate 1011 may include an opening 1021 for mounting an antenna module 1020. The rear surface plate 1011 may have a plurality of openings 1021 formed thereon. According to an embodiment of the disclosure, the opening 1021 may be formed in a shape corresponding to the shape of the antenna module 1020.

According to an embodiment of the disclosure, the side surface 1010B may be formed by a side surface bezel structure 1018 which is coupled with the front surface and the rear surface plate 1011 and includes metal and/or polymer. In a certain embodiment of the disclosure, the rear surface plate 1011 and the side surface bezel structure 1018 may be integrally formed with each other and may include the same material (for example, a metallic material, such as aluminum).

According to an embodiment of the disclosure, the antenna module 1020 may be disposed on the rear surface 1010A of the electronic device 1000. The antenna module 1020 may transmit signals or power to the outside of the electronic device 1000 or may receive signals or power from the outside. According to an embodiment of the disclosure, the electronic device 1000 may include a plurality of antenna modules 1020.

According to an embodiment of the disclosure, the sensor module 900 may be disposed on the rear surface 1010A of the electronic device 1000. The sensor module 900 may be a biometric recognition sensor that acquires biometric information from an external object. For example, the sensor module 900 may include a fingerprint sensor or a heart rate sensor.

Referring to FIG. 11B, the antenna module 1020 may include an antenna structure 1110, a UV curing adhesive member 1120 (for example, the UV curing adhesive member 730 of FIG. 6), a ceramic layer 1130 (for example, the ceramic layer 740 of FIG. 6), and a connector 1140. The antenna module 1020 may have at least a portion inserted into and disposed in the opening 1021 formed on the rear surface plate 1011 of the housing 1010. The antenna module 1020 may have at least one surface seen from the outside when it is viewed from the outside of the electronic device 1000. The antenna module 1020 exposed to the outside may have enhanced transmission and reception efficiency.

According to an embodiment of the disclosure, the antenna structure 1110 may overlap a periphery of the opening 1021 and may be disposed in contact with a bottom surface of the rear surface plate 1011. In another example, the antenna structure 1110 may be in contact with the periphery forming a circumference of the opening 1021. When the antenna structure 1110 is disposed in contact with the periphery forming the circumference of the opening 1021, the antenna structure 1110 may not include a flange shape which has a portion protruding therefrom.

According to an embodiment of the disclosure, the antenna structure 1110 may transmit signals or power to the outside (for example, an external electronic device) or may receive signals or power from the outside. According to an embodiment of the disclosure, the antenna structure 1110 may include one antenna including a conductor formed on a substrate (for example, a PCB) or a radiator formed in a conductive pattern. According to an embodiment of the disclosure, the antenna structure 1110 may include a plurality of antennas. In this case, at least one antenna suitable for a communication method used in a communication network, such as a first network (for example, the first network 198 of FIG. 1) or a second network (for example, the second network 199 of FIG. 1) may be selected from the plurality of antennas by a communication module (for example, the communication module 190 of FIG. 1), for example. Signals or power may be transmitted or received between the communication module and an external electronic device through the at least one selected antenna. According to a certain embodiment of the disclosure, other components (for example, an RFIC) than the radiator may be additionally formed as a portion of the antenna structure 1110.

According to an embodiment of the disclosure, the UV curing adhesive member 1120 may be disposed on the antenna structure 1110. The UV curing adhesive member 1120 may make the ceramic layer 1130 adhere to the antenna structure 1110. The UV curing adhesive member 1120 may be irradiated with UV rays passing through the ceramic layer 1130.

According to an embodiment of the disclosure, the ceramic layer 1130 may adhere to the antenna structure 1110 by the UV curing adhesive member 1120. The ceramic layer 1130 may protect the antenna structure 1110 by preventing the antenna structure 1110 from being exposed to an external environment. According to an embodiment of the disclosure, to cure the UV curing adhesive member 1120, the ceramic layer 1130 may allow UV rays to pass therethrough.

According to an embodiment of the disclosure, the connector 1140 may be disposed in contact with one surface of the antenna structure 1110. The connector 1140 may be connected with a wire member (for example, the FPCB 770 of FIG. 6). The antenna module 1120 may be electrically connected with a processor (for example, the processor 120 of FIG. 1) through the wire member connected to the connector 1140.

According to an embodiment of the disclosure, a first processed surface 1002a of the antenna module may include peripheries of the ceramic layer 1130, the UV curing adhesive member 1120, and one portion of the antenna structure 1110. According to an embodiment of the disclosure, the first processed surface 1002a of the antenna module may have a slope with reference to the ceramic layer 1130. For example, the slope of the first processed surface 1002a of the antenna module may be formed such that an area of a contact surface between the UV curing adhesive member 1120 and the antenna structure 1110 is larger than an area of a contact surface between the UV curing adhesive member 1120 and the ceramic layer 1130. Unlike the above description, the first processed surface 1002a may be formed only on the peripheries of the ceramic layer 1130 and the UV curing adhesive member 1120.

According to an embodiment of the disclosure, a second processed surface 1002b of the antenna module may be formed on the other periphery than the periphery of the antenna structure 1110 that is included in the first processed surface 1002a of the antenna module. The second processed surface 1002b of the antenna structure may be connected to the first processed surface 1002a of the antenna structure in a direction substantially perpendicular to the ceramic layer 1130, and may be extended.

Referring to FIG. 11C, the electronic device 1000 may include the sensor module 900. According to an embodiment of the disclosure, the sensor module 900 may be disposed on the rear surface 1010A of the electronic device 1000. The sensor module 900 may overlap the rear surface plate 1011 at least in part and may be disposed inside the electronic device 1000. A side surface of the sensor module 900 may be hidden by the rear surface plate 1011. One surface of a coating layer 750 may be seen from the outside through an opening formed on the rear surface plate 1011.

According to an embodiment of the disclosure, the sensor module 900 may include a biometric recognition sensor 710, a protection layer 720, an adhesive member 730, a ceramic layer 740, a substrate layer 760, and an FPCB 770.

According to an embodiment of the disclosure, the biometric recognition sensor 710 may be disposed on the substrate layer 760. The biometric recognition sensor 710 may include a fingerprint recognition sensor or a heart rate measurement sensor.

According to an embodiment of the disclosure, the protection layer 720 may be disposed on the substrate layer 760 and may be formed to enclose the biometric recognition sensor 710.

According to an embodiment of the disclosure, the UV curing adhesive member 730 may be disposed on the protection layer 720. The UV curing adhesive member 730 may make the ceramic layer 740 adhere to the protection layer 720.

According to an embodiment of the disclosure, the ceramic layer 740 may adhere to the protection layer 720 by the UV curing adhesive member 730. To cure the UV curing adhesive member 730, the ceramic layer may allow UV rays to pass therethrough. For example, the ceramic layer 740 may have a UV transmissivity of 0.01% to 70%. According to an embodiment of the disclosure, the ceramic layer 740 may further include the coating layer 750 on one surface. The coating layer 750 may include at least one of a color layer to represent color or an AF layer to prevent contamination.

According to an embodiment of the disclosure, the substrate layer 760 may be disposed on one surface of the biometric recognition sensor 710 to support the biometric recognition sensor 710 and the protection layer 720. The substrate layer 760 may be disposed to have at least one portion contacting a housing 810.

According to an embodiment of the disclosure, the FPCB 770 may be disposed on the opposite surface of the surface of the substrate layer 760 that contacts the biometric recognition sensor 710. The FPCB 770 may be electrically connected with the sensor module 700.

Figure 12:
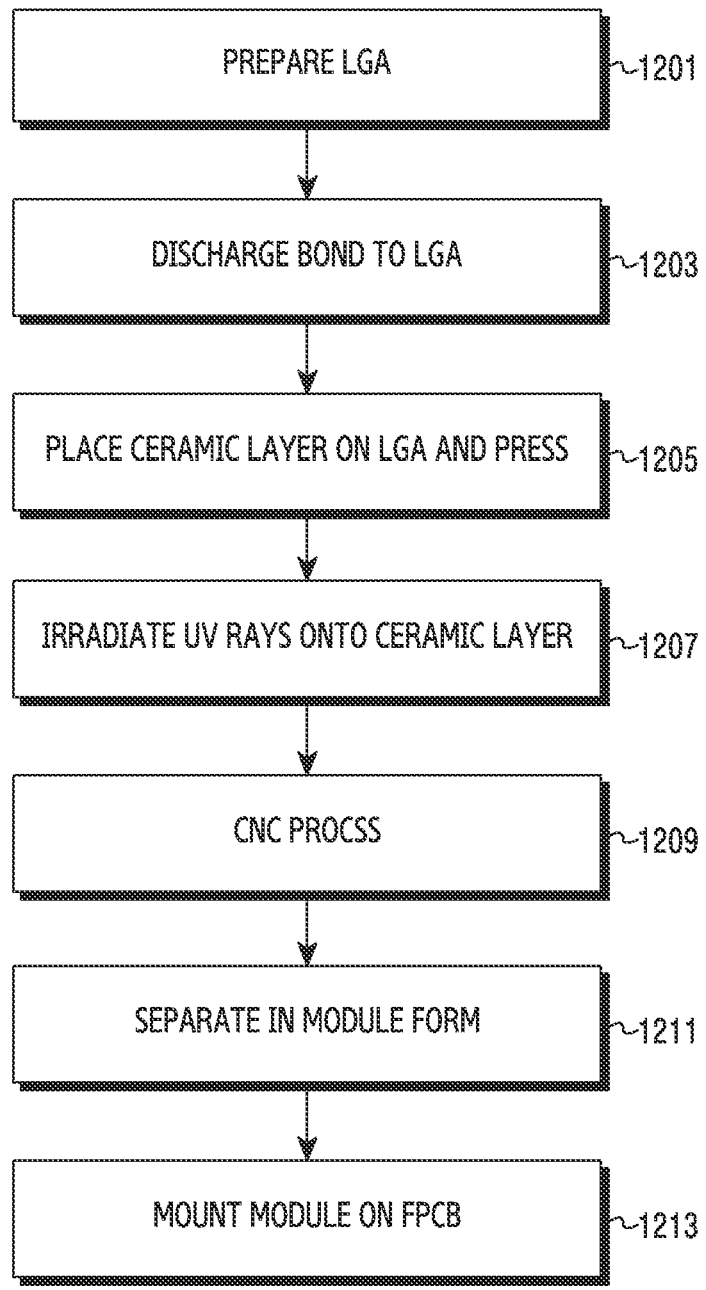
FIG. 12 is a sequence diagram of a sensor module manufacturing process according to an embodiment of the disclosure.

FIG. 12 is a sequence diagram of a sensor module manufacturing process according to an embodiment of the disclosure. FIGS. 13A, 13B, 13C, 13D, 13E, 13F, and 13G are views illustrating a manufacturing process of a sensor module according to various embodiments of the disclosure.

Referring to FIG. 12, a manufacturing process of the above-described sensor module (for example, the sensor module 700 of FIG. 6) may be sequentially illustrated.

Figure 13A:
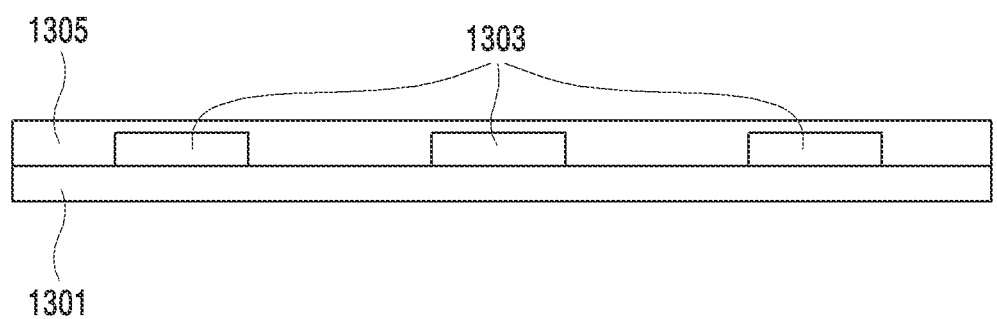
FIG. 13A is a view illustrating a manufacturing process of a sensor module according to an embodiment of the disclosure.

In operation 1201, a land grid array (LGA) may be prepared to manufacture a sensor module. Referring to FIG. 13A, the LGA may include a substrate layer 1301, a biometric recognition sensor 1303, and a protection layer 1305. A plurality of biometric recognition sensors 1303 (for example, the biometric recognition sensor 710 of FIG. 6) may be disposed on the substrate layer 1301 (for example, the substrate layer 760 of FIG. 6). The protection layer 1305 (for example, the protection layer 720 of FIG. 6) may be laminated on the substrate layer 1301 and the biometric recognition sensor 1203. The protection layer 1305 may be formed to enclose the biometric recognition sensor 1303. An upper surface of the protection layer 1305 may be substantially parallel to the substrate layer 1301. The substrate layer 1301, the biometric recognition sensor 1303, and the protection layer 1305 may be integrally formed with one another, thereby forming the land grid array (LGA).

Figure 13B:
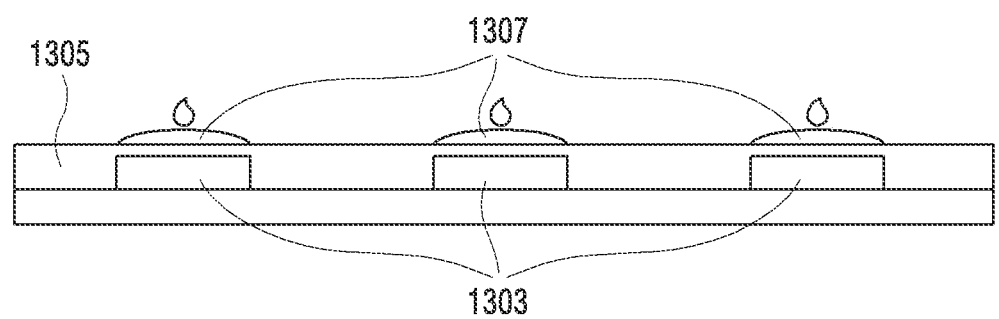
FIG. 13B is a view illustrating a manufacturing process of a sensor module according to an embodiment of the disclosure.

In operation 1203, a bond may be discharged onto the LGA. Referring to FIG. 13B, a UV curing adhesive member 1307 (for example, the UV curing adhesive member 730 of FIG. 6) may be applied onto the protection layer 1305 to overlap the biometric recognition sensor 1303. The UV curing adhesive member 1307 may be discharged onto the protection layer 1305 by using a bond dispenser.

Figure 13C:
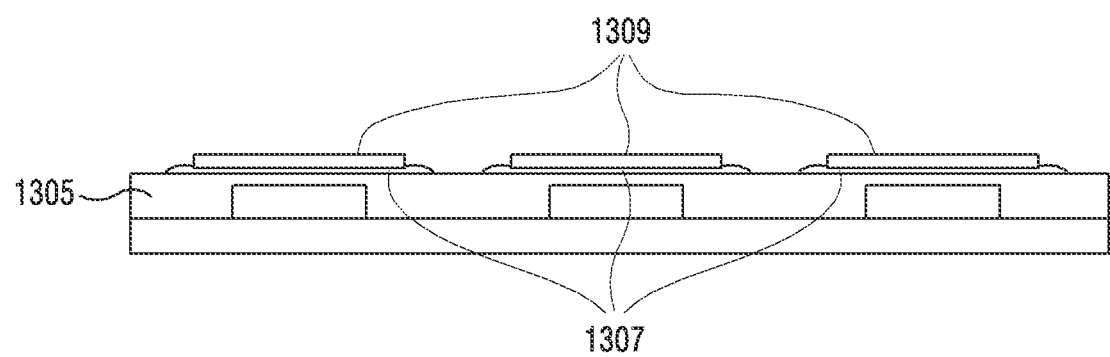
FIG. 13C is a view illustrating a manufacturing process of a sensor module according to an embodiment of the disclosure.
Figure 13D:
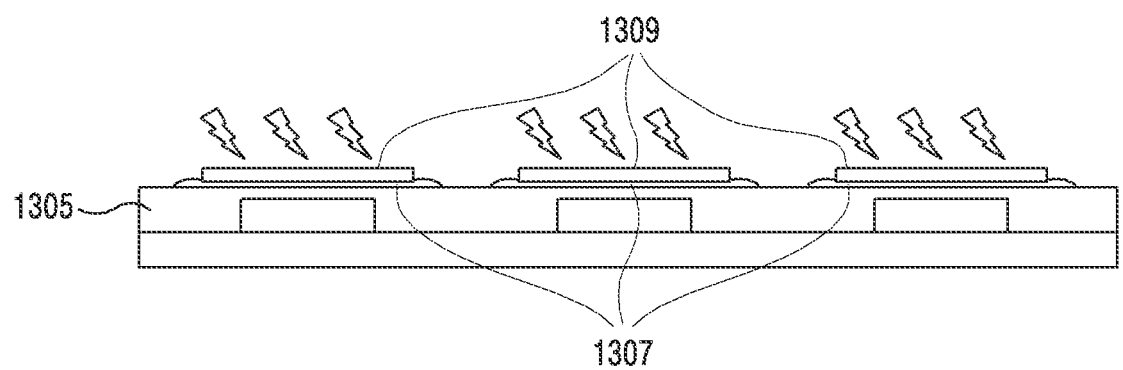
FIG. 13D is a view illustrating a manufacturing process of a sensor module according to an embodiment of the disclosure.

In operation 1205, a ceramic layer may be disposed on the LGA and may be pressed. Referring to FIG. 13C, the ceramic layer 1309 (for example, the ceramic layer 740 of FIG. 6) may be disposed on the UV curing adhesive member 1307 to overlap the biometric recognition sensor 1303 at least in part. The ceramic layer 1309 may be seated on the UV curing adhesive member 1307 by using a seating jig. The ceramic layer 1309 may be pressed on the protection layer 1305 by using a pressing jig. The pressing jig may control time and pressure for pressing the ceramic layer 1309. The ceramic layer 1309 is pressed on the protection layer 1305, so that bubbles in the UV curing adhesive member 1307 can be removed and the UV curing adhesive member can have uniform and thin thickness. The ceramic layer 1309 may further include a coating layer (for example, the coating layer 750 of FIG. 6) on one surface thereof In operation 1207, UV rays may be irradiated onto the ceramic layer. Referring to FIG. 13D, the UV curing adhesive member 1307 may be cured by UV rays passing through the ceramic layer 1309. The UV rays may be irradiated onto the ceramic layer 1309 through a UV LED irradiator. The ceramic layer 1309 may allow UV rays to pass therethrough and to reach the UV curing adhesive member 1307. The UV rays reaching the UV curing adhesive member 1307 may activate the adhesive member due to a chemical reaction. The UV curing adhesive member 1307 may be cured and the ceramic layer 1309 through which UV rays can pass may adhere to the protection layer 1305. When the sensor module is exposed to an environment of high temperature for a long time, an outer surface of the sensor module may be deformed and flatness may be reduced. In operation 1207, the UV curing adhesive member 1307 is instantaneously cured, so that deformation of the outer surface can be prevented and flatness can be enhanced.

Figure 13E:
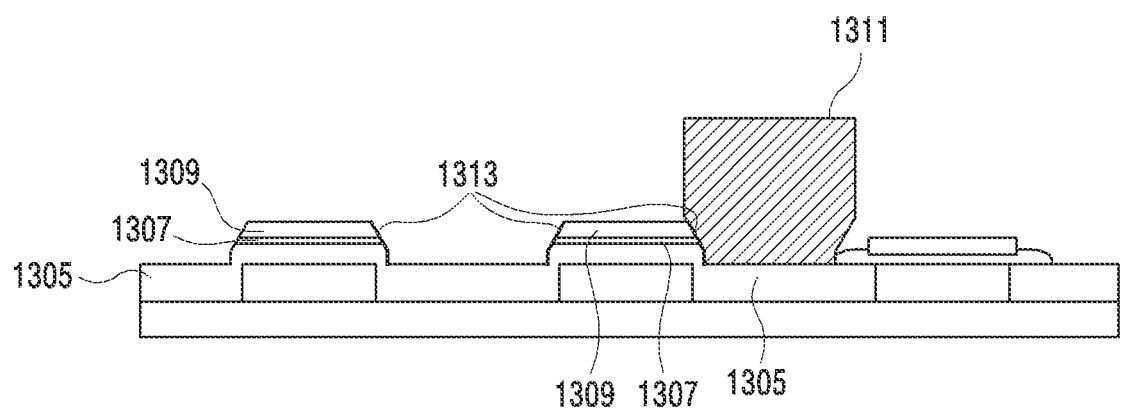
FIG. 13E is a view illustrating a manufacturing process of a sensor module according to an embodiment of the disclosure.

In operation 1209, a first processed surface may be formed on the sensor module having the ceramic layer adhering thereto by a CNC process. Referring to FIG. 13E, peripheries of the ceramic layer 1309, the UV curing adhesive member 1307, and one portion of the protection layer 1305 may form the first processed surface 1313 (for example, the chamfer surface 703a of FIG. 8A or the curved surface 703b of FIG. 8B). The first processed surface 1310 may be formed by first CNC processing equipment 1311. The first CNC processing equipment 1311 may use a diamond electrodeposition tool. In the operation of manufacturing the sensor module, the first processed surface 1313 is formed, so that a sharp edge portion of the ceramic layer 1309 can be removed. Since the UV curing adhesive member 1307 has low hardness even after being cured, the sensor module may endure a processing load of the first CNC processing equipment 1311. For example, if an adhesive of high hardness is used in the sensor module, the ceramic layer 1209 may be broken or may be released from the adhesive during the processing process of the first processed surface 1313, and thus processing reliability may be reduced.

Figure 13F:
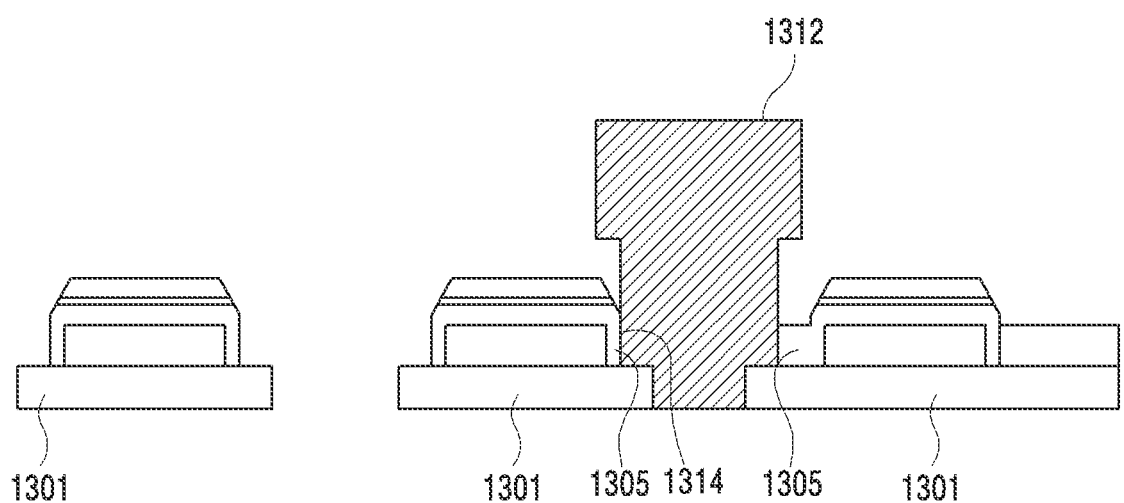
FIG. 13F is a view illustrating a manufacturing process of a sensor module according to an embodiment of the disclosure.

In operation 1211, the sensor module may be separated in a module form by secondary processing. Referring to FIG. 13F, in operation 1211, the sensor modules in the form of an array may be separated in a module form, respectively, by using second CNC processing equipment 1312. The other periphery of the protection layer 1305 than one portion of the protection layer 1305 that is included in the first processed surface 1313 may include a second processed surface 1314. The second CNC processing equipment 1312 may separate the sensor module in the module form, and may form a flange shape of the substrate layer 1301 which protrudes further than the second processed surface 1314 and a side surface of the protection layer 1305. The second CNC processing equipment 1312 may use a superhard material or a polycrystalline diamond (PCD). The second CNC processing equipment 1312 may be replaced with laser cutting equipment. The first CNC processing equipment 1311 and the second CNC processing equipment 1312 may be replaced with a single piece of equipment which is capable of forming the first processed surface 1313 and cutting in a module form. When the first CNC processing equipment 1311 and the second CNC processing equipment

1312 are replaced with a single piece of equipment, operations 1209 and 1211 may be performed by one operation.

Figure 13G:
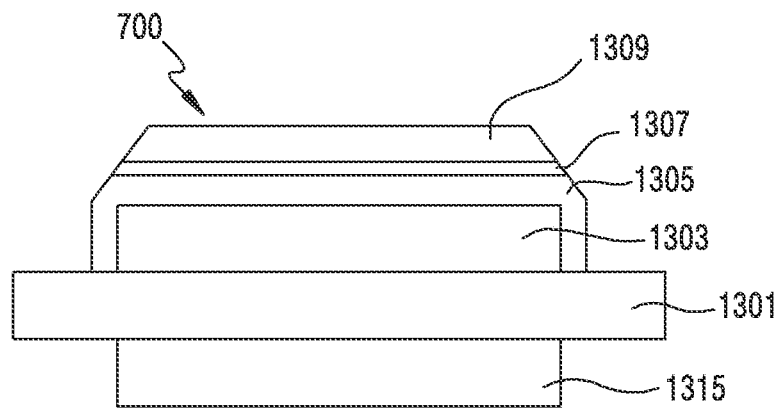
FIG. 13G is a view illustrating a manufacturing process of a sensor module according to an embodiment of the disclosure.

In operation 1213, the separated sensor module may be mounted on an FPCB. Referring to FIG. 13G, in operation 1213, the separated sensor module may be disposed on the FPCB 1315 (for example, the FPCB 770 of FIG. 6). The sensor module may be mounted on a surface of the FPCB 1315 by using surface mount device (SMD) equipment. The sensor module and the FPCB 1315 may be attached in various techniques, such as anisotropic conductive film (ACF) or anisotropic conductive adhesives (ACA).

An electronic device (for example, the electronic device 101 of FIG. 6) according to various embodiments described above may include: a housing (for example, the housing 550 of FIG. 6); and a sensor module (for example, the sensor module 700 of FIG. 6) disposed in at least a portion of the housing, and the sensor module may include: a fingerprint recognition sensor (for example, the biometric recognition sensor 710 of FIG. 6); a protection layer (for example, the protection layer 720 of FIG. 6) to enclose the fingerprint recognition sensor; an adhesive member (for example, the UV curing adhesive member 730 of FIG. 6) disposed on the protection layer; and a ceramic layer (for example, the ceramic layer 740 of FIG. 6) disposed on the adhesive member, and a periphery of the ceramic layer (for example, the periphery surface 741 of the ceramic layer of FIG. 7), a periphery of the adhesive member (for example, the periphery surface 731 of the UV curing adhesive member of FIG. 7), and a periphery of one portion of the protection layer (for example, the periphery surface 721 of one portion of the protection layer of FIG. 7) may include a processed surface (for example, the first processed surface 702a of FIG. 6).

According to an embodiment of the disclosure, the electronic device may further include a coating layer (for example, the coating layer 750 of FIG. 6) applied onto the ceramic layer, a periphery of the coating layer (for example, the periphery surface 751 of the coating layer of FIG. 7) may include the processed surface, and the coating layer may include at least one of an anti-fingerprint (AF) layer or a color layer.

According to an embodiment of the disclosure, the processed surface has a designated slope (for example, the slope θ of FIG. 8A) with reference to one surface of the ceramic layer.

According to an embodiment of the disclosure, a side surface of the protection layer may include a first area forming the processed surface and a second area (for example, the second processed surface 702b of FIG. 6) substantially perpendicular to one surface of the ceramic layer, and the first area may be continuous with the second area, and the slope may be 10° to 70°.

According to an embodiment of the disclosure, the ceramic layer may include a lower surface which is in contact with the adhesive member, and an upper surface (for example, the upper surface 701 of the sensor module of FIG. 6) which faces the lower surface, and an area of the lower surface may be larger than an area of the upper surface.

According to an embodiment of the disclosure, the processed surface may have a designated radius of curvature (for example, the radius of curvature R of FIG. 8B), and the designated radius of curvature may be 0.08 mm to 0.5 mm.

According to an embodiment of the disclosure, the electronic device may further include a substrate layer (for example, the substrate layer 760 of FIG. 6) to support the sensor module, and the housing may include an opening (for example, the opening 551 of FIG. 6) formed to be spaced apart from a periphery of the sensor module to correspond to a shape of the sensor module, and the opening may have a periphery overlapping the substrate layer.

According to an embodiment of the disclosure, the substrate layer may be disposed inside the housing, at least a portion of the sensor module may be accommodated in the opening, and the sensor module may be disposed on the substrate layer to have the ceramic layer face toward an outside of the housing.

According to an embodiment of the disclosure, the adhesive member may be a UV curing adhesive member.

According to an embodiment of the disclosure, the housing may include a first surface (for example, the front surface 515 of FIG. 2) facing in a first direction in a flat state, a second surface (for example, the rear surface 535 of FIG. 2) facing in a second direction which is opposite to the first direction, and a side surface (for example, the side surface 515 of FIG. 2) formed between the first surface and the second surface, wherein the housing may include: a hinge structure (for example, the hinge structure 540 of FIG. 4) which is convertible into a folding state (for example, a folded state of the electronic device 101 of FIG. 3) or an unfolding state (for example, a flat state of the electronic device 101 of FIG. 2); a first housing structure (for example, the first housing structure 510 of FIG. 5) which is connected to the hinge structure and includes a first side surface member enclosing one space between the first surface and the second surface at least in part; and a second housing structure (for example, the second housing structure 520 of FIG. 4) which is connected to the hinge structure, includes a second side surface member enclosing the other space between the first surface and the second surface at least in part, and is folded with the first housing structure with reference to the hinge structure, wherein the first surface (for example, the first area 201 of FIG. 2) of the first housing structure may face the first surface (for example, the second area 202 of FIG. 2) of the second housing structure in the folding state, wherein the second module may be disposed on the side surface.

According to an embodiment of the disclosure, the electronic device may further include a flexible display (for example, the display 200 of FIG. 2) which is formed on the first surface of the housing to cross over the first housing structure and the second housing structure, and is bendable by the hinge structure, and the flexible display may include a transparent plate (for example, the plate 240 of FIG. 4) to allow light emitted from a pixel to pass therethrough.

According to an embodiment of the disclosure, the protection layer may be an epoxy molding compound (EMC).

According to an embodiment of the disclosure, the ceramic layer may have a thickness of 0.05 mm to 0.5 mm.

According to an embodiment of the disclosure, the ceramic layer may include at least one of zirconia ($ZrO_2$), alumina ($Al_2O_3$), or glass ($SiO_2$).

According to an embodiment of the disclosure, the ceramic layer may have a UV transmissivity of 0.01% to 70%.

According to various embodiments described above, a sensor module (for example, the sensor module 700 of FIG. 6) may include a fingerprint recognition sensor (for example, the biometric recognition sensor 710 of FIG. 6), a protection layer (for example, the protection layer 720 of FIG. 6) enclosing the fingerprint recognition sensor, a UV curing adhesive member (for example, the UV curing adhesive member 730 of FIG. 6) disposed on the protection layer, a ceramic layer (for example, the ceramic layer 740 of FIG. 6) disposed on the adhesive member and allowing UV rays to pass therethrough, and a coating layer (for example, the coating layer 750 of FIG. 6) disposed on the ceramic layer and forming one surface (for example, the upper surface 701 of the sensor module of FIG. 6) of the sensor module, wherein the one surface is substantially parallel to the fingerprint recognition sensor, and the coating layer, the ceramic layer, the UV curing adhesive member, and one portion of the protection layer include a processed surface (for example, the first processed surface 702a of FIG. 6).

According to an embodiment of the disclosure, the processed surface has a designated slope (for example, the slope θ of FIG. 8A) with reference to one surface of the sensor module.

According to an embodiment of the disclosure, a side surface of the protection layer may include a first area forming the processed surface and a second area (for example, the second processed surface 702b of FIG. 6) substantially perpendicular to one surface of the sensor module, and the first area may be continuous with the second area, and the slope may be 10° to 70°.

According to an embodiment of the disclosure, the ceramic layer may have a UV transmissivity of 0.01% to 70%.

According to an embodiment of the disclosure, the processed surface may have a designated radius of curvature (for example, the radius of curvature R of FIG. 8B), and the designated radius of curvature may be 0.08 mm to 0.5 mm According to an embodiment of the disclosure, the ceramic layer may be formed such that an area of a contact surface between the ceramic layer and the UV curing adhesive member is larger than an area of a contact surface between the ceramic layer and the coating layer.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing; and
sensor circuitry disposed in at least a portion of the housing,
wherein the sensor circuitry comprises:
a fingerprint recognition sensor;
a protection layer enclosing the fingerprint recognition sensor;
an adhesive member disposed on the protection layer; and
a ceramic layer disposed on the adhesive member, and
wherein a periphery of the ceramic layer, a periphery of the adhesive member, and a periphery of one portion of the protection layer comprise a processed surface having a designated slope with respect to one surface of the ceramic layer, and
wherein the periphery of the ceramic layer, the periphery of the adhesive member, and the periphery of the one portion of the protection layer are coplanar along the designated slope and form an external surface of the sensor circuitry.

2. The electronic device of claim 1, further comprising:
a coating layer applied onto the ceramic layer,
wherein a periphery of the coating layer comprises the processed surface, and
wherein the coating layer comprises at least one of an anti-fingerprint (AF) layer or a color layer.

3. The electronic device of claim 1,
wherein a side surface of the protection layer comprises a first area forming the processed surface and a second area substantially perpendicular to the one surface of the ceramic layer,
wherein the first area is continuous with the second area, and
wherein the designated slope is between 10° and 70°.

4. The electronic device of claim 1,
wherein the ceramic layer comprises a lower surface contacting the adhesive member, and an upper surface facing the lower surface, and
wherein an area of the lower surface is larger than an area of the upper surface.

5. The electronic device of claim 1,
wherein the processed surface has a designated radius of curvature, and
wherein the designated radius of curvature is 0.08 millimeters (mm) to 0.5 mm.

6. The electronic device of claim 1, further comprising:
a substrate layer supporting the sensor circuitry,
wherein the housing comprises an opening formed to be spaced apart from a periphery of the sensor circuitry to correspond to a shape of the sensor circuitry, and
wherein the opening has a periphery overlapping the substrate layer.

7. The electronic device of claim 6,
wherein the substrate layer is disposed inside the housing,
wherein at least a portion of the sensor circuitry is accommodated in the opening, and
wherein the sensor circuitry is disposed on the substrate layer to have the ceramic layer face toward an outside of the housing.

8. The electronic device of claim 6,
wherein a remaining portion of the protection layer other than the one portion is perpendicular to the one surface of the ceramic layer,
wherein the substrate layer overlaps a periphery of an opening formed on a side surface of the housing,
wherein the housing includes a first surface formed along the periphery of the opening, and
wherein the first surface of the housing is parallel to and faces the remaining portion of the protection layer.

9. The electronic device of claim 1, wherein the adhesive member is an ultraviolet (UV) curing adhesive member.

10. The electronic device of claim 1,
wherein the housing comprises:
a first surface facing a first direction in a flat state;
a second surface facing a second direction opposite to the first direction;
a side surface formed between the first surface and the second surface;
a hinge structure which is convertible into a folding state or an unfolding state;
a first housing structure connected to the hinge structure and comprising a first side surface member enclosing a first part of a space between the first surface and the second surface; and a second housing structure connected to the hinge structure, and comprising a second side surface member enclosing a second part of the space between the first surface and the second surface, wherein the second housing structure is foldable with the first housing structure with reference to the hinge structure, wherein a first surface of the first housing structure faces a first surface of the second housing structure in the folding state, and wherein the sensor circuitry is disposed on the side surface.

11. The electronic device of claim 10, further comprising:

a flexible display formed on the first surface of the housing to cross over the first housing structure and the second housing structure, the flexible display being bendable by the hinge structure, wherein the flexible display comprises a transparent plate to allow light emitted from a pixel to pass therethrough.

12. The electronic device of claim 1, wherein the protection layer is an epoxy molding compound (EMC).

13. The electronic device of claim 1, wherein the ceramic layer has a thickness between 0.05 millimeters (mm) and 0.5 mm.

14. The electronic device of claim 1, wherein the ceramic layer comprises at least one of zirconia ($ZrO_2$), alumina ($Al_2O_3$), or glass ($SiO_2$).

15. The electronic device of claim 1, wherein the ceramic layer has an ultraviolet (UV) transmissivity of between 0.01% and 70%.

16. The electronic device of claim 1, wherein the protection layer is disposed on a substrate layer and the fingerprint recognition sensor, and wherein the protection layer contacts at least three side surfaces including a top surface of the fingerprint recognition sensor and covers an entire portion of the top surface of the fingerprint recognition sensor.

* * * * *